US007579546B2

(12) United States Patent
Sumita

(10) Patent No.: US 7,579,546 B2
(45) Date of Patent: Aug. 25, 2009

(54) TEMPO DETECTION APPARATUS AND TEMPO-DETECTION COMPUTER PROGRAM

(75) Inventor: Ren Sumita, Hamamatsu (JP)

(73) Assignee: Kabushiki Kaisha Kawai Gakki Seisakusho, Shizuoka (JP)

( * ) Notice: Subject to any disclaimer, the term of this patent is extended or adjusted under 35 U.S.C. 154(b) by 216 days.

(21) Appl. No.: 11/882,384

(22) Filed: Aug. 1, 2007

(65) Prior Publication Data

US 2008/0034948 A1 Feb. 14, 2008

(30) Foreign Application Priority Data

Aug. 9, 2006 (JP) ............................ 2006-216362

(51) Int. Cl.
*G10H 1/40* (2006.01)
*G06F 17/00* (2006.01)

(52) U.S. Cl. ............................ 84/611; 84/635; 84/651; 84/667; 84/713; 84/612; 84/636; 700/94

(58) Field of Classification Search .................. 84/611, 84/612, 635, 636, 651, 652, 667, 668, 713, 84/714; 700/94
See application file for complete search history.

(56) References Cited

U.S. PATENT DOCUMENTS

| | | | | |
|---|---|---|---|---|
| 5,453,570 | A * | 9/1995 | Umeda et al. | 84/636 |
| 6,316,712 | B1 * | 11/2001 | Laroche | 84/636 |
| 7,276,656 | B2 * | 10/2007 | Wang | 84/612 |
| 2002/0148347 | A1 * | 10/2002 | Herberger et al. | 84/636 |
| 2005/0211072 | A1 * | 9/2005 | Lu et al. | 84/612 |
| 2005/0217461 | A1 * | 10/2005 | Wang | 84/608 |
| 2008/0115656 | A1 * | 5/2008 | Sumita | 84/612 |

FOREIGN PATENT DOCUMENTS

JP 2002-341888 A 11/2002

* cited by examiner

*Primary Examiner*—Walter Benson
*Assistant Examiner*—Andrew R Millikin
(74) *Attorney, Agent, or Firm*—Sughrue Mion, PLLC

(57) ABSTRACT

A user is asked to perform tapping at beat positions by using a tapping detection section while listening to the beginning of a waveform from which beats are to be detected. When a fluctuation calculation section determines that tapping fluctuation falls in a predetermined range, a beat interval close in number to the tempo of the tapping is selected from among beat-interval candidates detected by a tempo-candidate detection section, and a tapping position where tapping becomes stable is determined to be the starting beat position. Tapping by the user for just some beats allows beats to be detected in the entire musical piece more correctly.

6 Claims, 15 Drawing Sheets

Fig. 8

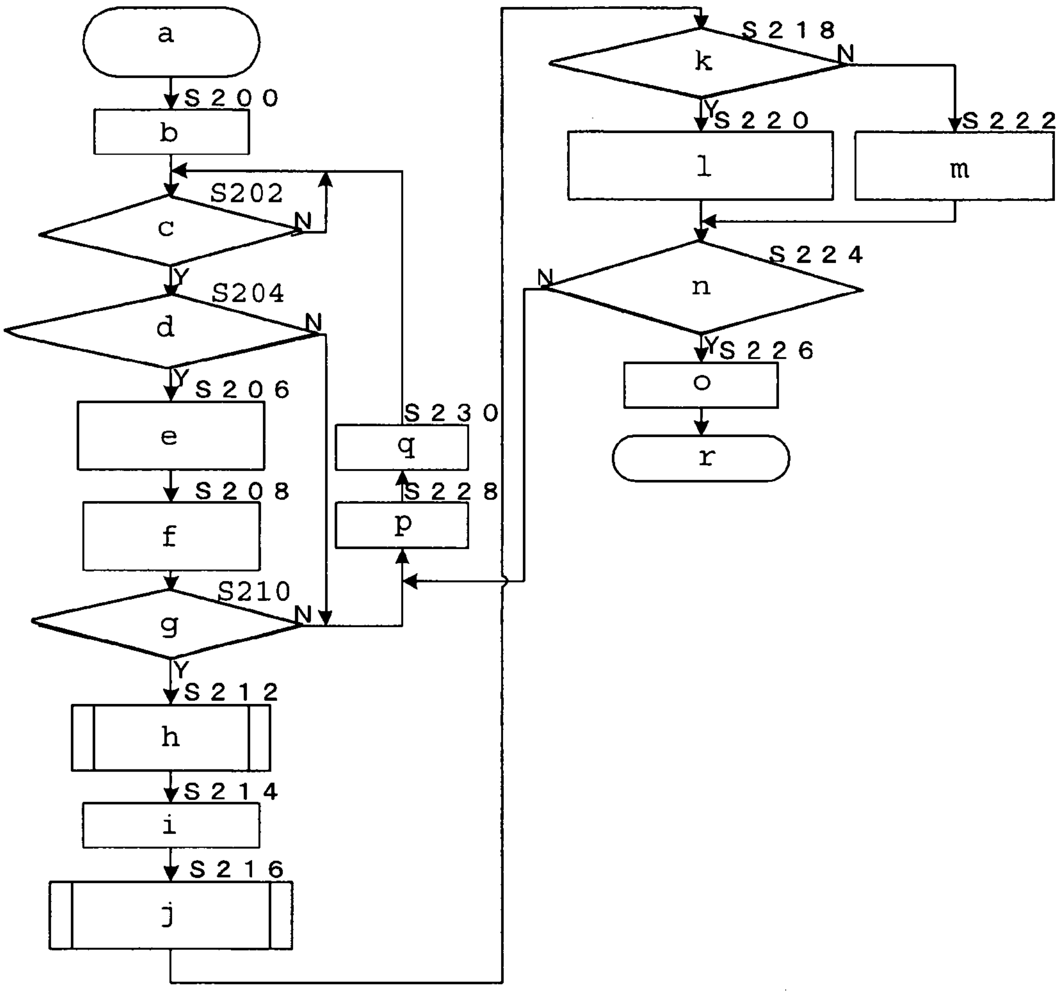

a: Processing until tempo determination
b: Initialize variables
c: Tapping?
d: Tapping count > 0?
e: Record tapping interval and time
f: Increment beat
g: Tapping count ≧ N?
h: Tempo calculation using moving averages
i: Display tempo
j: Tempo fluctuation calculation for N most recent tapping
k: Tempo fluctuation ≦ P%?
l: Increment fluctuation-check pass count
m: Set fluctuation-check pass count to zero
n: Fluctuation-check pass count ≧ M?
o: Determine tempo
p: Update variables
q: Flash
r: End When $\sigma = \sqrt{\dfrac{-1}{2 \cdot \log_e(0.4)}}$ $$k = e^{-\frac{\left|\frac{s}{\tau_{max} \cdot F}\right|^3}{2 \cdot \sigma^2}}$$

C

Cm

Fig. 20A
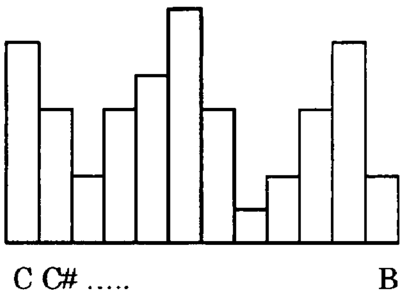
Fig. 20B
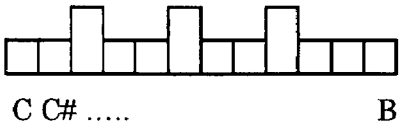
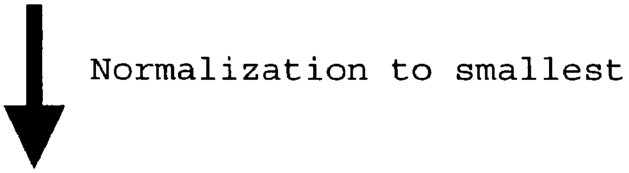
Fig. 20C
PowerOfNote1
Fig. 20D
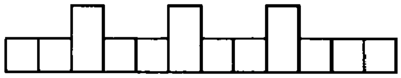
PowerOfNote2

TEMPO DETECTION APPARATUS AND TEMPO-DETECTION COMPUTER PROGRAM

BACKGROUND OF THE INVENTION

1. Field of the Invention

The present invention relates to a tempo detection apparatus and a tempo-detection computer program.

2. Discussion of Background

A tempo detection apparatus has been developed for detecting beat positions from a musical acoustic signal (audio signal) in which the sounds of a plurality of musical instruments are mixed, such as the audio signals of music compact discs (CDs).

In that apparatus, to detect beat positions, a fast Fourier transform (FFT) is applied to an input waveform at predetermined time intervals (frames); the power of each note in a scale is obtained from the obtained power spectrum; an incremental value of the power of each note in the scale at each frame interval is calculated; the incremental values are summed up for all the notes in the scale to obtain the degree of change of all the notes at each frame interval; the autocorrelation of the degree of change of all the notes at each frame interval is calculated to obtain periodicity; and an average beat interval (so-called tempo) is obtained from the frame interval which maximizes the autocorrelation.

When the average beat interval is obtained, the degrees of changes of all the notes at frames separated by beat intervals are added up with the starting frame being shifted by one frame, in frames (having a length about ten times the average beat interval, for example) at the top portion of the waveform, and the starting frame which maximizes the total value is regarded as the starting beat position.

SUMMARY OF THE INVENTION

With this method, however, beat intervals are erroneously determined in some cases corresponding to half or twice the tempo of a musical piece. In some cases, in a musical piece where off-beats have accents, beat positions are determined to be at off-beats.

The present invention has been made in consideration of the foregoing problem. An object of the present invention is to provide a tempo detection apparatus and a tempo-detection computer program capable of detecting an average beat interval (so-called tempo) and beat positions without an error.

To achieve the foregoing object, the present invention provides, in its first aspect, a tempo detection apparatus. The tempo detection apparatus includes signal input means for receiving an acoustic signal; scale-note-power detection means for applying a fast Fourier transform to the received acoustic signal at predetermined frame intervals and for obtaining the power of each note in a scale at each frame interval from the obtained power spectrum; tempo-candidate detection means for summing up, for all the notes in the scale, an incremental value of the power of each note in the scale at the predetermined frame intervals to obtain a total of the incremental values of the powers, indicating the degree of change of all the notes at each frame interval, and for obtaining an average beat interval from the total of the incremental values of the powers to detect tempo candidates; meter input means for receiving meter input by a user; tapping detection means for detecting tapping input by the user; recording means for recording tapping intervals, the time when each tapping is performed, and a beat value of each tapping; tapping-tempo calculation means for calculating moving averages of the tapping intervals to calculate a tempo; fluctuation calculation means for calculating a fluctuation in tapping tempo for each of latest moving averages; tapping-tempo output means for outputting, when the fluctuation falls in a predetermined range, the tapping tempo, the time when the last tapping was performed, and a beat value at that time; tempo determination means for selecting a beat interval close in number to the tapping tempo output from the tapping-tempo output means, from among beat-interval candidates detected by the tempo-candidate detection means; first-beat-position output means for outputting a first-beat position closest to the beat value of tapping obtained when the fluctuation calculation means determines that tapping fluctuation falls in the predetermined range; beat-position determination means for determining, as the starting beat position, the position of the tapping obtained when the fluctuation calculation means determines that tapping fluctuation falls in the predetermined range, and for determining each beat position therebefore and thereafter according to the tempo determined by the tempo determination means; and bar detection means for detecting a bar-line position according to the first-beat position output from the first-beat-position output means and each beat position output from the beat-position determination means.

According to the above structure, a user is asked to perform tapping at beat positions by using the tapping detection means while listening to the beginning of a waveform from which beats are to be detected. When user-tapping beat intervals become stable over some beats (when it is determined that tapping fluctuation falls in a predetermined range), the interval is taken as the beat interval (a beat interval close in number to the tempo of the tapping is selected from among beat-interval candidates detected by the tempo-candidate detection means), and a tapping position where the tapping becomes stable is determined to be the starting beat position. Therefore, tapping by the user for just some beats allows beats to be detected in the entire musical piece more correctly.

In other words, the user is asked to perform tapping at beat positions while listening to sound being played back, and, from that operations, the beat interval and the starting beat positions used for detecting beats are extracted, increasing tempo-detection precision.

To average beat intervals, it is better to use moving averages with recent intervals being weighted. It is preferred that it be determined that user-tapping beat intervals (tempo) become stable when the fluctuation (shift from the average) of the N (for example, four) most recent tempos is within P % (for example, 5%); the tempo be determined when the stable state continues M (for example, four) times; and then the user tapping be finished.

The configuration of another aspect of the present invention specifies a program itself executable by a computer to cause the computer to implement the structure described in the first aspect. More specifically, as a structure for handling the above-described problem, the program is read and executable by the computer to realize the processing means in the structure specified in the first aspect of the present invention, by using the structure of the computer. The computer may be not only a general-purpose computer having a central processing unit but also a special-purpose computer. The computer needs to have a central processing unit but there is no other special limitations.

When the program for realizing the processing means described above is read by the computer, the same function implementing means as that specified in the first aspects of the present invention is achieved.

Specifically, to achieve the foregoing object, the present invention provides, in the other aspect, a tempo-detection computer program. The tempo-detection computer program is read and executed by a computer to cause the computer to function as: signal input means for receiving an acoustic signal; scale-note-power detection means for applying a fast Fourier transform to the received acoustic signal at predetermined frame intervals and for obtaining the power of each note in a scale at each frame interval from the obtained power spectrum; tempo-candidate detection means for summing up, for all the notes in the scale, an incremental value of the power of each note in the scale at the predetermined frame intervals to obtain a total of the incremental values of the powers, indicating the degree of change of all the notes at each frame interval, and for obtaining an average beat interval from the total of the incremental values of the powers to detect tempo candidates; meter input means for receiving meter input by a user; tapping detection means for detecting tapping input by the user; recording means for recording tapping intervals, the time when each tapping is performed, and a beat value of each tapping; tapping-tempo calculation means for calculating moving averages of the tapping intervals to calculate a tempo; fluctuation calculation means for calculating a fluctuation in tapping tempo for each of latest moving averages; tapping-tempo output means for outputting, when the fluctuation falls in a predetermined range, the tapping tempo, the time when the last tapping was performed, and a beat value at that time; tempo determination means for selecting a beat interval close in number to the tapping tempo output from the tapping-tempo output means, from among beat-interval candidates detected by the tempo-candidate detection means; first-beat-position output means for outputting a first-beat position closest to the beat value of tapping obtained when the fluctuation calculation means determines that tapping fluctuation falls in the predetermined range; beat-position determination means for determining, as the starting beat position, the position of the tapping obtained when the fluctuation calculation means determines that tapping fluctuation falls in the predetermined range, and for determining each beat position therebefore and thereafter according to the tempo determined by the tempo determination means; and bar detection means for detecting a bar-line position according to the first-beat position output from the first-beat-position output means and each beat position output from the beat-position determination means.

With the structure of the program described above, when an existing hardware resource is used to execute the program, the existing hardware resource easily realizes the tempo detection apparatus according to the present invention.

Because of its form, the program can be easily used, distributed, and sold by using communication or other means.

A part of the functions of the function implementing means described in the other aspect of the present invention may be implemented by functions built in the computer (functions integrated in the computer in a hardware manner or functions implemented by an operating system or other application program installed in the computer) and the program may include instructions for calling or linking the functions achieved by the computer.

When a part of the function implementing means specified in the first aspect is achieved by a part of functions implemented, for example, by the operating system, a program or module that implements that function does not directly exist. However, when a part of functions of the operating system that implements the function is called or linked, substantially the same structure is achieved.

According to the tempo detection apparatus and the tempo-detection computer program according to the present invention, the average beat interval (so-called tempo) and beat positions can be detected without errors.

BRIEF DESCRIPTION OF THE DRAWINGS

FIG. 8 is a flowchart showing a processing flow until tempo determination in step S106 in FIG. 5;

FIGS. 20A to D are views showing an outline method for calculating the Euclidean distance of the power of each note in the scale, performed by a second bar-division determination section.

DETAILED DESCRIPTION OF THE PREFERRED EMBODIMENTS

Figure 1:
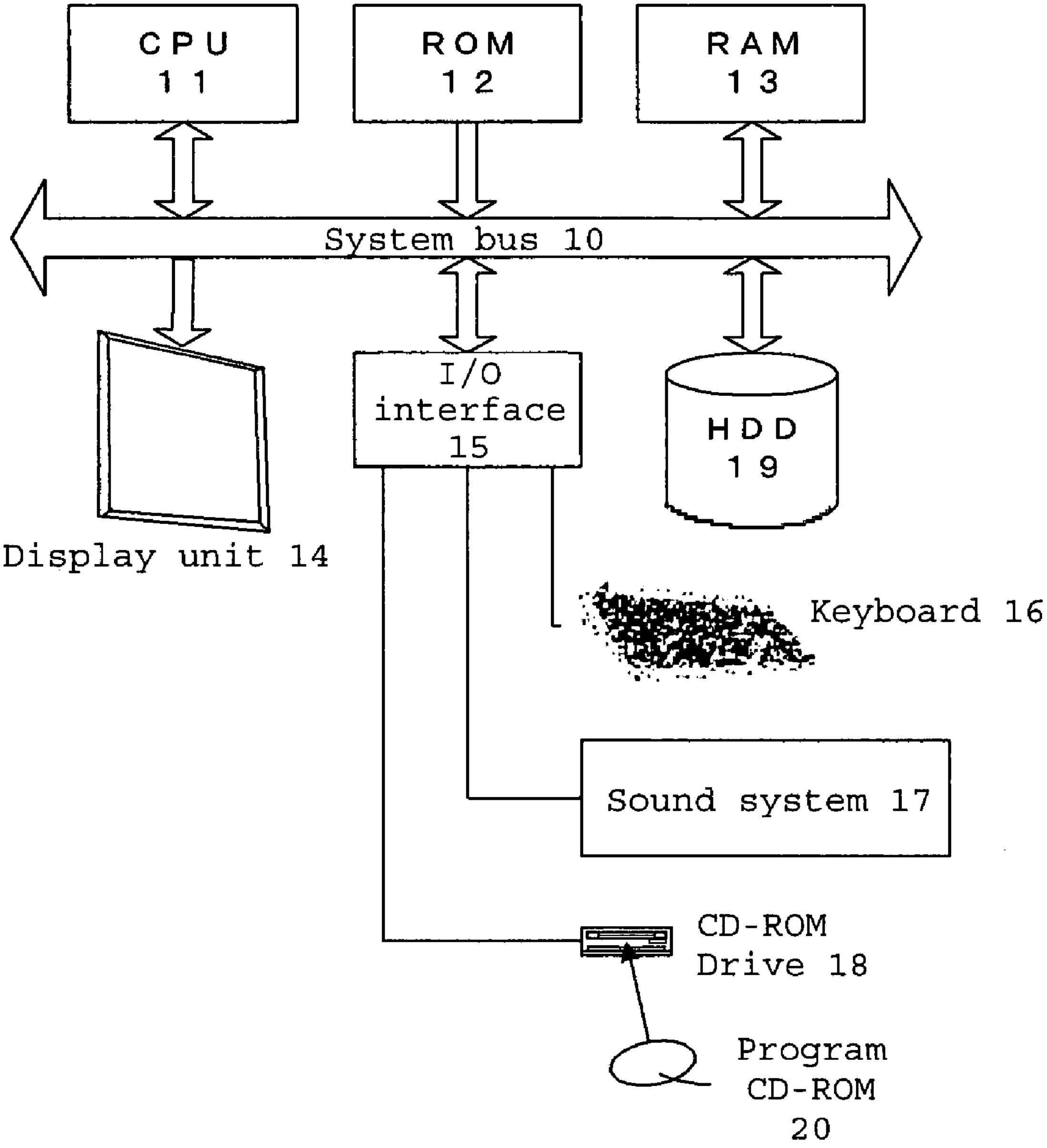
FIG. 1 shows the structure of a personal computer to which a preferred embodiment of the present invention is applied.

Embodiments will be described below by referring to the drawings.

First Embodiment

FIG. 1 shows the structure of a personal computer according to a preferred embodiment of the present invention. In the structure, a CD-ROM 20 includes a program which can cause the personal computer to function as a tempo detection apparatus according to the present invention when the CD-ROM 20 is placed in a CD-ROM drive 18, described later, and the program is read and executed. In other words, when the CD-ROM 20 is placed in the CD-ROM drive 18 and the program is read and executed, the tempo detection apparatus according to the present invention is implemented in the personal computer.

In the personal computer shown in FIG. 1, a CPU 11, a ROM 12, a RAM 13, an I/O interface 15, a hard disk drive 19 are connected via a system bus 10. A display unit 14 is also connected to the system bus 10 through an image control section, now shown. Control signals and data are exchanged between the devices through the system bus 10.

The CPU 11 is a central processing unit for controlling the entire tempo detection apparatus according to the program, which is read from the CD-ROM 20 by the CD-ROM drive 18 and stored in the hard disk drive 19 or in the RAM 13. The CPU 11, in which the program is operating, serves as a scale-note-power detection section 101, a tempo-candidate detection section 102, a tapping-tempo calculation section 106, a fluctuation calculation section 107, a tapping-tempo output section 108, a first-beat-position output section 109, a tempo determination section 110, a beat-position determination section 111, and a bar detection section 112, which will be described later.

The ROM 12 is a storage area that stores BIOS of the personal computer and others.

The RAM 13 is used as a storage area for the program, a working area, a temporary storage area (temporarily storing variables described later, for example) for various coefficients, parameters, an exercise flag and a storage flag, described later, and others, and other areas.

The display unit 14 is controlled by the image control section, not shown, which performs necessary image processing according to an instruction of the CPU 11 and displays the results of the image processing.

The I/O interface 15 is connected to a keyboard 16, a sound system 17, and the CD-ROM drive 18, which are connected to the system bus 10 through the I/O interface 15. Control signals and data are exchanged between these devices and the above-described devices connected to the system bus 10.

Among these devices, the keyboard 16 serves as a tapping detection section 104, described later.

The CD-ROM 18 reads a tempo-detection program and data from the CD-ROM 20, which stores the program. The program and data area stored in the hard disk drive 19 and a main program is stored in the RAM 13 and is executed by the CPU 11.

When the tempo detection program is read and executed, the hard disk drive 19 stores the program itself, necessary data, and others. The data stored in the hard disk drive 19 include performance data and singing data similar to those input from the sound system 17 and the CD-ROM drive 18.

Figure 2:
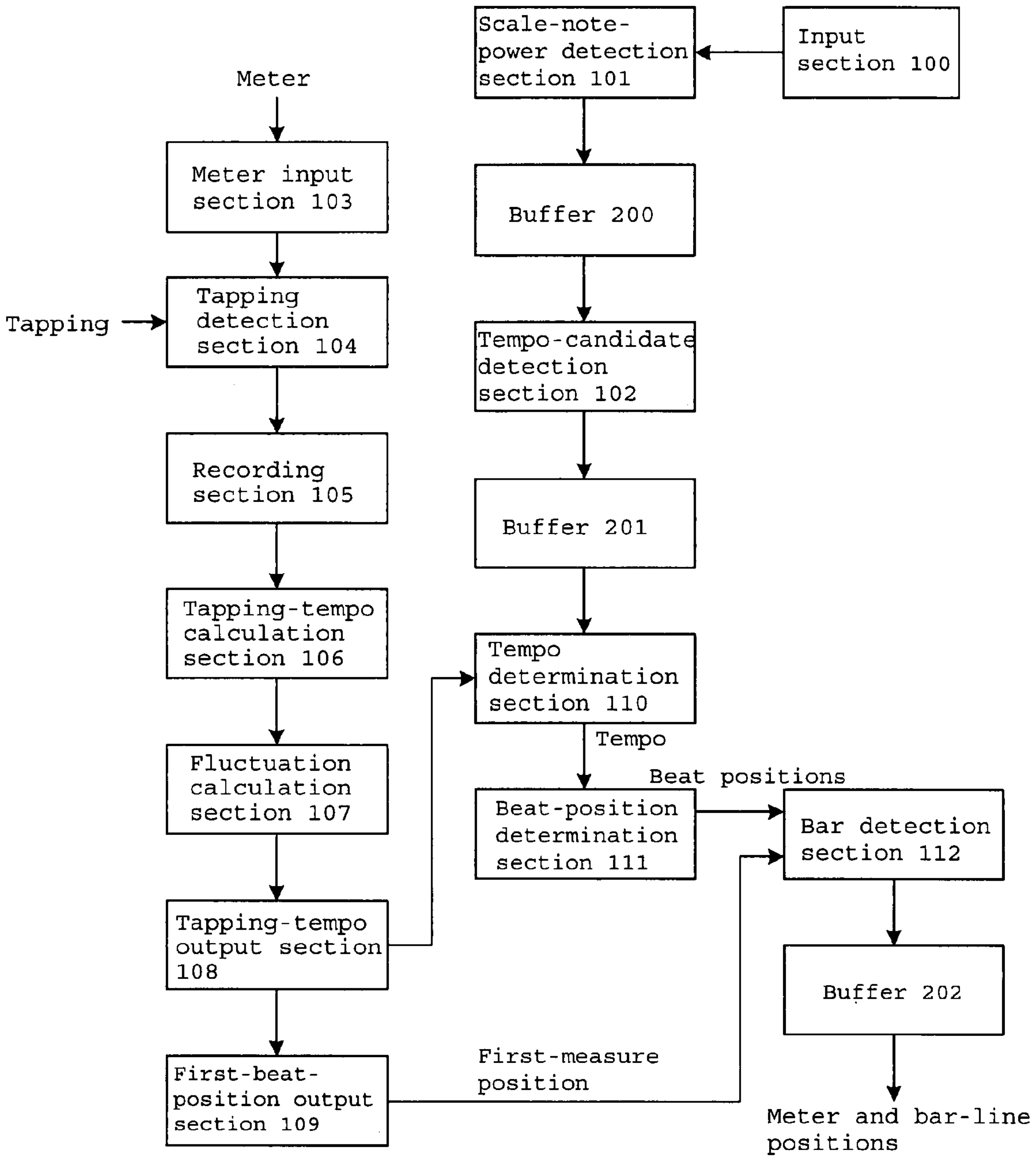
FIG. 2 is a block diagram of a tempo detection apparatus according to the embodiment of the present invention.

When the tempo detection program is read by the personal computer (into the RAM 13 and the hard disk drive 19) and is executed (by the CPU 11), the personal computer serves as a tempo detection apparatus shown in FIG. 2.

FIG. 2 is a block diagram of the tempo detection apparatus according to an embodiment of the present invention. In the figure, the tempo detection apparatus includes an input section 100 for receiving an acoustic signal; the scale-note-power detection section 101 for applying a fast Fourier transform (FFT) to the received acoustic signal at predetermined time intervals (frames) and for obtaining the power of each note in a scale at each frame interval from the obtained power spectrum; the tempo-candidate detection section 102 for summing up, for all the notes in the scale, an incremental value of the power of each note in the scale at each frame interval to obtain the total of the incremental values of the powers, indicating the degree of change of all the notes at each frame interval, and for detecting an average beat interval and the position of each beat, from the total of the incremental values of the powers; a meter input section 103 for receiving meter input by a user; the tapping detection section 104 for detecting tapping input by the user; a recording section 105 for recording tapping intervals, the time when each tapping is performed, and a beat value of each tapping; the tapping-tempo calculation section 106 for calculating moving averages of the tapping intervals to calculate a tempo; the fluctuation calculation section 107 for calculating a fluctuation in tapping tempo for each of latest moving averages; a tapping-tempo output section 108 for outputting, when the fluctuation falls in a predetermined range, the tapping tempo, the time when the last tapping was performed, and the beat value at that time; the tempo determination section 110 for selecting a beat interval close in number to the tapping tempo output from the tapping-tempo output section 108, from among beat-interval candidates detected by the tempo-candidate detection section 102; the first-beat-position output section 109 for outputting a first-beat position closest to the beat value of tapping obtained when the fluctuation calculation section 107 determines that the tapping fluctuation falls in the predetermined range; the beat-position determination section 111 for determining, as the starting beat position, the position of the tapping obtained when the fluctuation calculation section 107 determines that the tapping fluctuation falls in the predetermined range, and for determining each beat position therebefore and thereafter according to the tempo determined by the tempo determination section 110; and the bar detection section 112 for detecting a bar-line position according to the first-beat position output from the first-beat-position output section 109 and each beat position output from the beat-position determination section 111.

Figure 3:
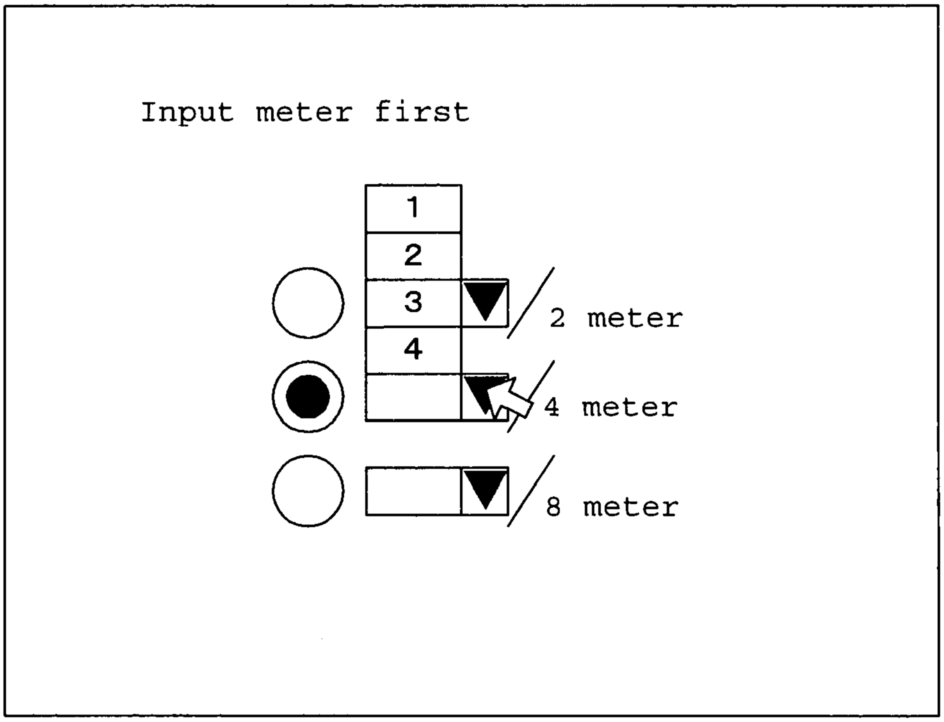
FIG. 3 is a view showing an input screen for inputting meter for a musical piece.

When the tempo-detection program is read by the personal computer (into the RAM 13 and the hard disk drive 19) and is executed (by the CPU 11), the meter input section 103 first displays a screen shown in FIG. 3 to prompt the user to input the meter of a musical piece from which the tempo is to be detected. The user inputs a meter in response to the prompt. FIG. 3 shows a state in which the user is going to select one of one-four to four-four meters.

The input section 100 receives a musical acoustic signal from which the tempo is to be detected. An analog signal received from a microphone or other device through the sound system 17 may be converted to a digital signal by an A-D converter (not shown), or digitized musical data read by the CD-ROM drive 18, such as that in a music CD, may be directly taken (ripped) as a file and be opened (in that case, the file can be temporarily stored in the hard disk drive 19). When a digital signal received in this way is a stereo signal, it is converted to a monaural signal to simplify the subsequent processing.

Figure 4:
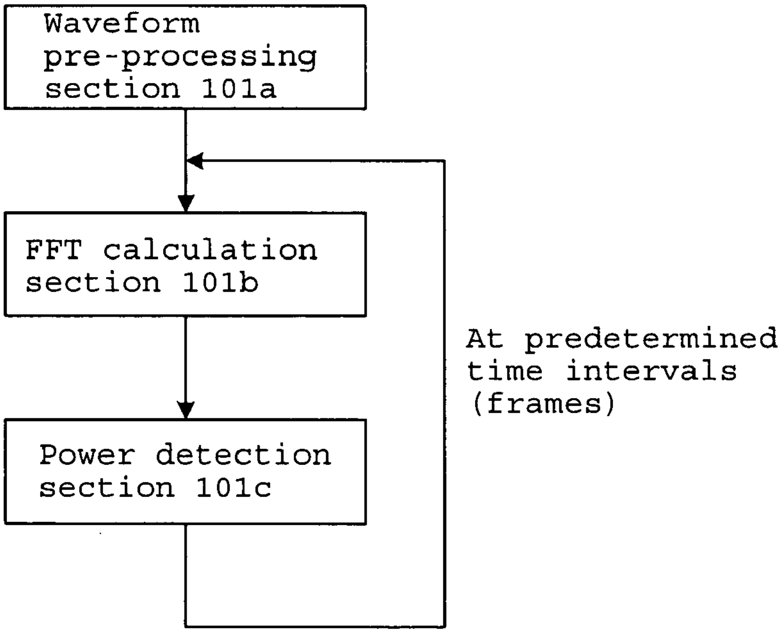
FIG. 4 is a block diagram of a scale-note-power detection section in the tempo detection apparatus.

The digital signal is input to the scale-note-power detection section 101. The scale-note-power detection section 101 is formed of sections shown in FIG. 4.

Among them, a waveform pre-processing section 101*a* down-samples the acoustic signal sent from the input section 100, at a sampling frequency suited to the subsequent processing.

The down-sampling rate is determined by the range of a musical instrument used for beat detection. Specifically, to use the performance sounds of rhythm instruments having a high range, such as cymbals and hi-hats, for beat detection, it is necessary to set the sampling frequency after down-sampling to a high frequency. To mainly use the bass note, the sounds of musical instruments such as bass drums and snare drums, and the sounds of musical instruments having a middle range for beat detection, it is not necessary to set the sampling frequency after down-sampling to such a high frequency.

When it is assumed that the highest note to be detected is A6 (C4 serves as the center "do"), for example, since the fundamental frequency of A6 is about 1,760 Hz (when A4 is set to 440 Hz), the sampling frequency after down-sampling needs to be 3,520 Hz or higher, and the Nyquist frequency is thus 1,760 Hz or higher. Therefore, when the original sampling frequency is 44.1 kHz (which is used for music CDs), the down-sampling rate needs to be about one twelfth. In this case, the sampling frequency after down-sampling is 3,675 Hz.

Usually in down-sampling processing, a signal is passed through a low-pass filter which removes components having the Nyquist frequency (1,837.5 Hz in the current case), that is, half of the sampling frequency after down-sampling, or higher, and then data in the signal is skipped (11 out of 12 waveform samples are discarded in the current case).

Down-sampling processing is performed in this way in order to reduce the FFT calculation time by reducing the number of FFT points required to obtain the same frequency resolution in FFT calculation to be performed after the down-sampling processing.

Such down-sampling is necessary when a sound source has already been sampled at a fixed sampling frequency, as in music CDs. However, when an analog signal input from a microphone or other device to the input section 100 is converted to a digital signal by the A-D converter, the waveform pre-processing section can be omitted by setting the sampling frequency of the A-D converter to the sampling frequency after down-sampling.

When down-sampling is finished in this way in the waveform pre-processing section 101_a_, an FFT calculation section 101_b_ applies FFT to the output signal of the waveform pre-processing section at predetermined time intervals (frames).

FFT parameters (number of FFT points and FFT window shift) should be set to values suitable for beat detection. Specifically, if the number of FFT points is increased to increase the frequency resolution, the FFT window size is enlarged to use a longer time period for one FFT cycle, reducing the time resolution. This FFT characteristic needs to be taken into account. (In other words, for beat detection, it is better to increase the time resolution with the frequency resolution suppressed.) There is a method in which, instead of using a waveform having the same length as the window length, waveform data is specified only for a part of the window and the remaining part is filled with zeros to increase the number of FFT points without suppressing the time resolution. However, the number of waveform samples needs to be set up to a certain point in order to also detect a low-note power correctly.

The above points have been taken into account. In the apparatus, the number of FFT points is set to 512, the window shift is set to 32 samples (window overlap is 15/16), and filling with zeros is not performed. When the FFT calculation is performed with these settings, the time resolution is about 8.7 ms, and the frequency resolution is about 7.2 Hz. A time resolution of 8.7 ms is sufficient because the length of a thirty-second note is 25 ms in a musical piece having a tempo of 300 quarter notes per minute.

The FFT calculation is performed in this way in each frame interval; the squares of the real part and the imaginary part of the FFT result are added and the sum is square-rooted to calculate the power spectrum; and the power spectrum is sent to a power detection section 101_c_.

The power detection section 101_c_ calculates the power of each note in the scale from the power spectrum calculated in the FFT calculation section 101_b_. The FFT calculates just the powers of frequencies that are integer multiples of the value obtained when the sampling frequency is divided by the number FFT points. Therefore, the following process is performed to detect the power of each note in the scale from the power spectrum. The power of the spectrum having the maximum power among power spectra corresponding to the frequencies falling in the range of 50 cents (100 cents correspond to one semitone) above and below the fundamental frequency of each note (from C1 to A6) in the scale is set to the power of the note.

When the powers of all the notes in the scale have been detected, they are stored in a buffer 200. The waveform reading position is advanced by a predetermined time interval (one frame, which corresponds to 32 samples in the above case), and the processes in the FFT calculation section 101_b_ and the power detection section 101_c_ are performed again. This set of steps is repeated until the waveform reading position reaches the end of the waveform.

With the above-described processing, the power of each note in the scale for each predetermined time interval is stored in the buffer 200 for the acoustic signal input to the input section 100.

The structure of the tempo-candidate detection section 102, shown in FIG. 2, will be described next. The tempo-candidate detection section 102 performs processing according to a procedure shown in FIG. 5.

The tempo-candidate detection section 102 detects an average beat interval (that is, tempo) and the positions of beats, based on a change in the power of each note in the scale for each frame interval, the power being output from the scale-note-power detection section. The tempo-candidate detection section 102 first calculates, in step S100, the total of incremental values of the powers of the notes in the scale (the total of the incremental values in power from the preceding frame for all the notes in the scale; if the power is reduced from the preceding frame, zero is added).

When the power of the i-th note in the scale at frame time "t" is called $L_i(t)$, an incremental value $L_{addi}(t)$ of the power of the i-th note is as shown in the following expression 1. The total L(t) of incremental values of the powers of all the notes in the scale at frame time "t" can be calculated by the following expression 2, where T indicates the total number of notes in the scale.

$$L_{addi}(t) = \begin{cases} L_i(t) - L_i(t-1) & (\text{when } L_i(t-1) \leq L_i(t)) \\ 0 & (\text{when } L_i(t-1) > L_i(t)) \end{cases} \quad \text{Expression 1}$$

$$L(t) = \sum_{i=0}^{T-1} L_{addi}(t) \quad \text{Expression 2}$$

The total value L(t) indicates the degree of change in all the notes in each frame interval. This value suddenly becomes large when notes start sounding and increases when the number of notes that start sounding at the same time increases. Since notes start sounding at the position of a beat in many musical pieces, it is highly possible that the position where this value becomes large is the position of a beat.

Figure 6:
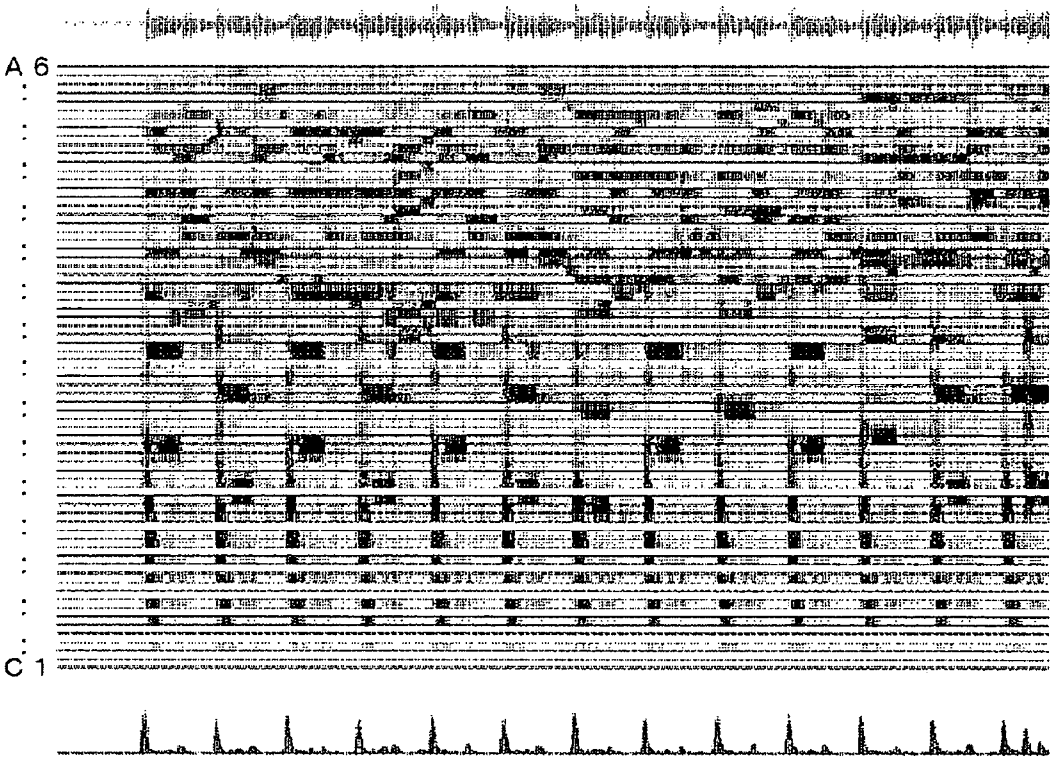
FIG. 6 is a graph showing the waveform of a part of a musical piece, the power of each note in a scale, and the total of the power incremental values of the notes in the scale.

As an example, FIG. 6 shows the waveform of a part of a musical piece, the power of each note in the scale, and the total of the incremental values in power of the notes in the scale. The upper row indicates the waveform, the middle row indicates the power of each note in the scale for each frame interval with black and white gradation (in the range of C1 to A6 in this figure, with a lower note at a lower position and a higher note at a higher position), and the lower row indicates the total of the incremental values in power of the notes for each frame interval. Since the power of each note in the scale shown in this figure is output from the scale-note-power detection section, the frequency resolution is about 7.2 Hz; the powers of some notes, G#2 and lower, in the scale cannot be calculated and are not shown. Even though the powers of some low notes cannot be measured, there is no problem because the purpose is to detect beats.

As shown in the lower row in the figure, the total of the incremental values in power of the notes in the scale has peaks periodically. The positions of these periodic peaks are those of beats.

To obtain the positions of beats, the tempo-candidate detection section 102 first obtains the time difference between these periodic peaks, that is, the average beat interval. The average beat interval can be obtained from the autocorrelation of the total of the incremental values in power of the notes in the scale (in step S102 in FIG. 5).

The autocorrelation $\phi(\tau)$ of the total L(t) of the incremental values in power of the notes in the scale at frame time "t" is given by the following expression 3:

$$\phi(\tau) = \frac{\sum_{t=0}^{N-\tau-1} L(t) \cdot L(t+\tau)}{N-\tau} \quad \text{Expression 3}$$

Where N indicates the total number of frames and $\tau$ indicates a time delay.

Figure 7:
FIG. 7 is a view showing the concept of autocorrelation calculation.

FIG. 7 shows the concept of the autocorrelation calculation. As shown in the figure, when the time delay "$\tau$" is an integer multiple of the period of peaks of L(t), $\phi(\tau)$ becomes a large value. Therefore, when the maximum value of $\phi(\tau)$ is obtained in a prescribed range of "$\tau$", the tempo of the musical piece is obtained.

The range of "$\tau$" where the autocorrelation is obtained needs to be changed according to an expected tempo range of the musical piece. For example, when calculation is performed in a range of 30 to 300 quarter notes per minute in metronome marking, the range where autocorrelation is calculated is from 0.2 to 2.0 seconds. The conversion from time (seconds) to frames is given by the following expression 4.

$$\text{Number of frames} = \frac{\text{Time (seconds)} \times \text{sampling frequency}}{\text{Number of samples per frame}} \quad \text{Expression 4}$$

The beat interval may be set to "$\tau$" where the autocorrelation $\phi(\tau)$ is maximum in the range. However, since "$\tau$" where the autocorrelation is maximum in the range is not necessarily the beat interval for all musical pieces, candidates for the beat interval are obtained from "$\tau$" values where the autocorrelation is local maximum in the range (in step S104 in FIG. 5) and, as described later, based on the tapping tempo, the time when the last tapping was performed, and a beat value at that time output from the tapping-tempo output section 108 when the fluctuation in tapping tempo for each of latest moving averages falls in the predetermined range, the tempo determination section 110 determines a tempo close in number to the tapping tempo, from among those plural candidates.

FIG. 8 is a flowchart of processing in step S106 until the tempo is determined.

Variables specified in the RAM 13 are initialized in step S200. The variables include a tapping count (TapCt), the time when the preceding tapping was performed (PrevTime; with this variable, the current time, which is the period of time in milliseconds elapsed from the activation of the personal computer, is obtained by Now( )), the current beat (CurBeat, which is one of "0", "1", "2", and "3" in the quadruple meter and which is incremented by "1" and displayed when the beat number is made to glow in step S230 (flash) of FIG. 8), and a fluctuation-check pass count (PassCt). These variables are all set to "0".

When the user taps the space key of the keyboard 16 while listening to musical sound being played back, the keyboard 16 serves as the tapping detection section 104. The tapping detection section 104 checks whether tapping is being performed or not in step S202. When there is no tapping (No in step S202), tapping checking continues.

When tapping is detected (Yes in step S202), it is determined whether the tapping count (TapCt) is larger than "0" in step S204. When the tapping count (TapCt) is zero or less (No in step S204), a variable update process (the tapping count (TapCt) is incremented and the time when the preceding tapping was performed (PrevTime) is set in the current time Now( )) is performed in step S228, a rectangular part where the beat number is written is made to glow in synchronization with the tapping in step S230, and the processing returns to step S202. The foregoing processes are then repeated.

When the tapping count (TapCt) is larger than zero (Yes in step S204), the tapping interval (DeltaTime.Add(Now( )-PrevTime)) and the time (Time.Add(CurPlayTime)) are recorded in the recording section 105 in step S206, where DeltaTime is an array of the elapsed time from when the preceding tapping had been performed to when the current tapping was performed; CurPlayTime indicates the time from the top of the waveform to the current play position (this value is held, and when the tempo is finally determined, the time corresponding to the first beat is returned to the program); and Time is an array where CurPlayTime is stored.

Then, the beat is incremented in step S208 (CurBeat++), where CurBeat increases to the meter (BeatNume, the numerator of the meter), input through the meter input section 103, minus "1".

Next, it is determined in step S210 whether the tapping count (DeltaTime.GetSize( )) reaches N or more (for example, four or more). When the tapping count (DeltaTime.GetSize( )) is smaller than N (No in step S210), the variable update process (the tapping count (TapCt) is incremented and the time when the preceding tapping was performed (PrevTime) is set in the current time Now( )) is performed in step S228, the rectangular part where the beat number is written is made to glow in synchronization with the tapping in step S230, and the processing returns to step S202. The foregoing processes are then repeated.

When it is determined that the tapping count (DeltaTime.GetSize( )) is N or more (Yes in step S210), the tapping-tempo calculation section 106 calculates moving averages of N tapping intervals in a processing procedure shown in FIG. 9, described later, to calculate the tapping tempo (Tempo expressed in BPM (beats per measure)) in step S212. A quarter note corresponds to 120 BMP, for example.

The tapping tempo is displayed on the display unit 14 in step S214.

Furthermore, the fluctuation calculation section 107 calculates a fluctuation in tapping tempo of the N most recent taps in a processing procedure shown in FIG. 10, described later, in step S216.

It is determined in step S218 whether the fluctuation of the tapping tempo is P % or smaller. When the fluctuation of the tapping tempo is not P % or smaller (No in step S218), the fluctuation-check pass count (PassCt) is set to zero in step S222.

When the fluctuation of the tapping tempo is P % or smaller (Yes in step S218), the fluctuation-check pass count (PassCt) is incremented in step S220.

Then, it is determined in step S224 whether the fluctuation-check pass count (PassCt) is M or larger. When the fluctuation-check pass count (PassCt) is not M or larger (No in step S224), the variable update process (the tapping count (TapCt) is incremented and the time when the preceding tapping was performed (PrevTime) is set in the current time Now( )) is performed in step S228, the rectangular part where the beat number is written is made to glow in synchronization with the tapping in step S230, and the processing returns to step S202. The foregoing processes are then repeated.

When the fluctuation-check pass count (PassCt) is M or larger (Yes in step S224), the tapping-tempo output section 108 outputs the tapping tempo, and the tempo determination section 110 selects a beat interval numerically close to the tapping tempo from among the beat-interval candidates detected by the tempo-candidate detection section 102, in step S226.

When the tempo determination section 110 selects the beat interval close in number to the tapping tempo from among the beat-interval candidates detected by the tempo-candidate detection section 102, the beat-position determination section 111 determines the tapping position as the starting beat position and determines each beat position located therebefore and thereafter according to the beat interval selected by the tempo determination section 110.

Figure 5:
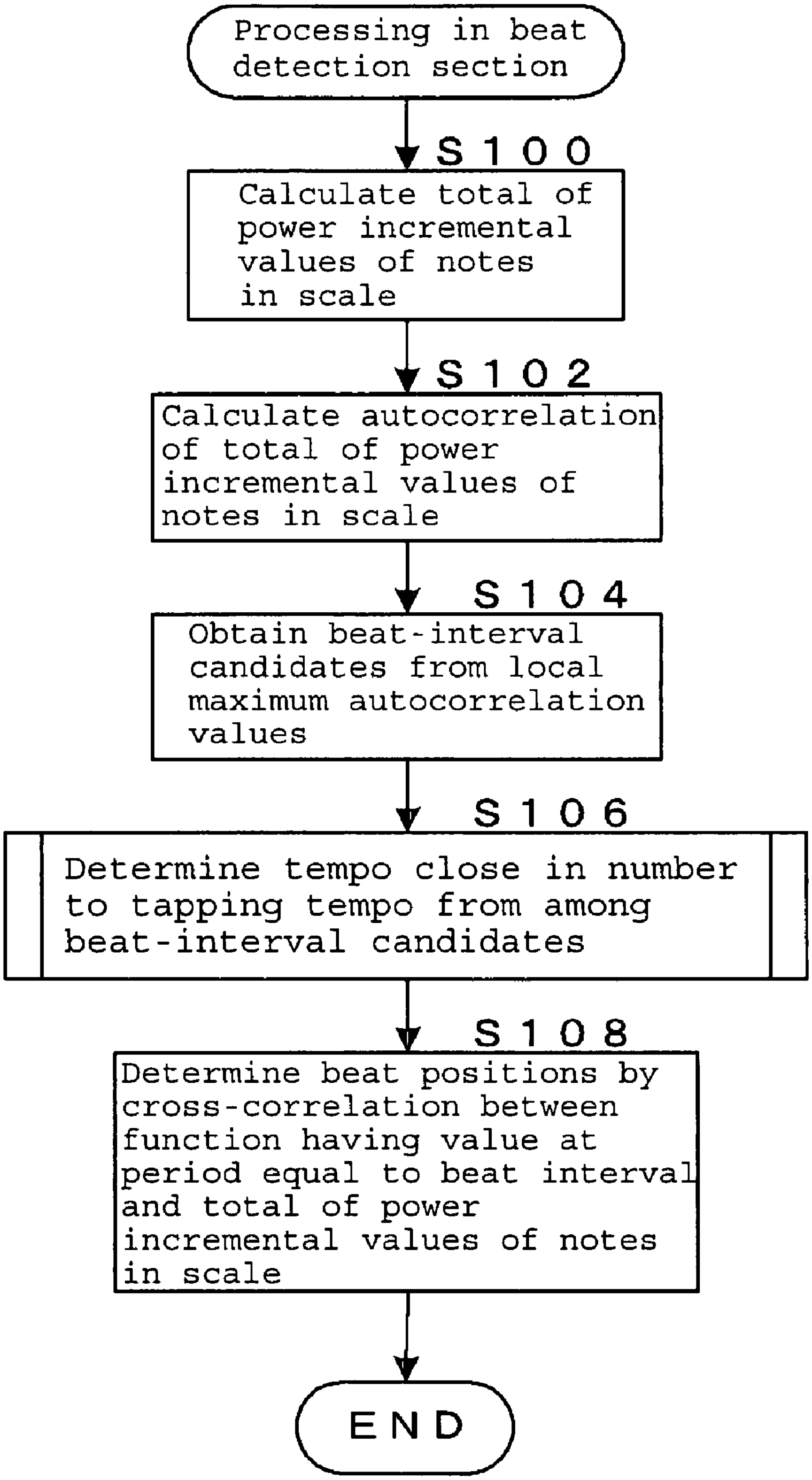
FIG. 5 is a flowchart showing a processing flow in a tempo-candidate detection section in the tempo detection apparatus.

When the first beat position is determined with the foregoing processing, subsequent beat positions are determined one by one with a method described later, in step S108 of FIG. 5.

Figure 9:
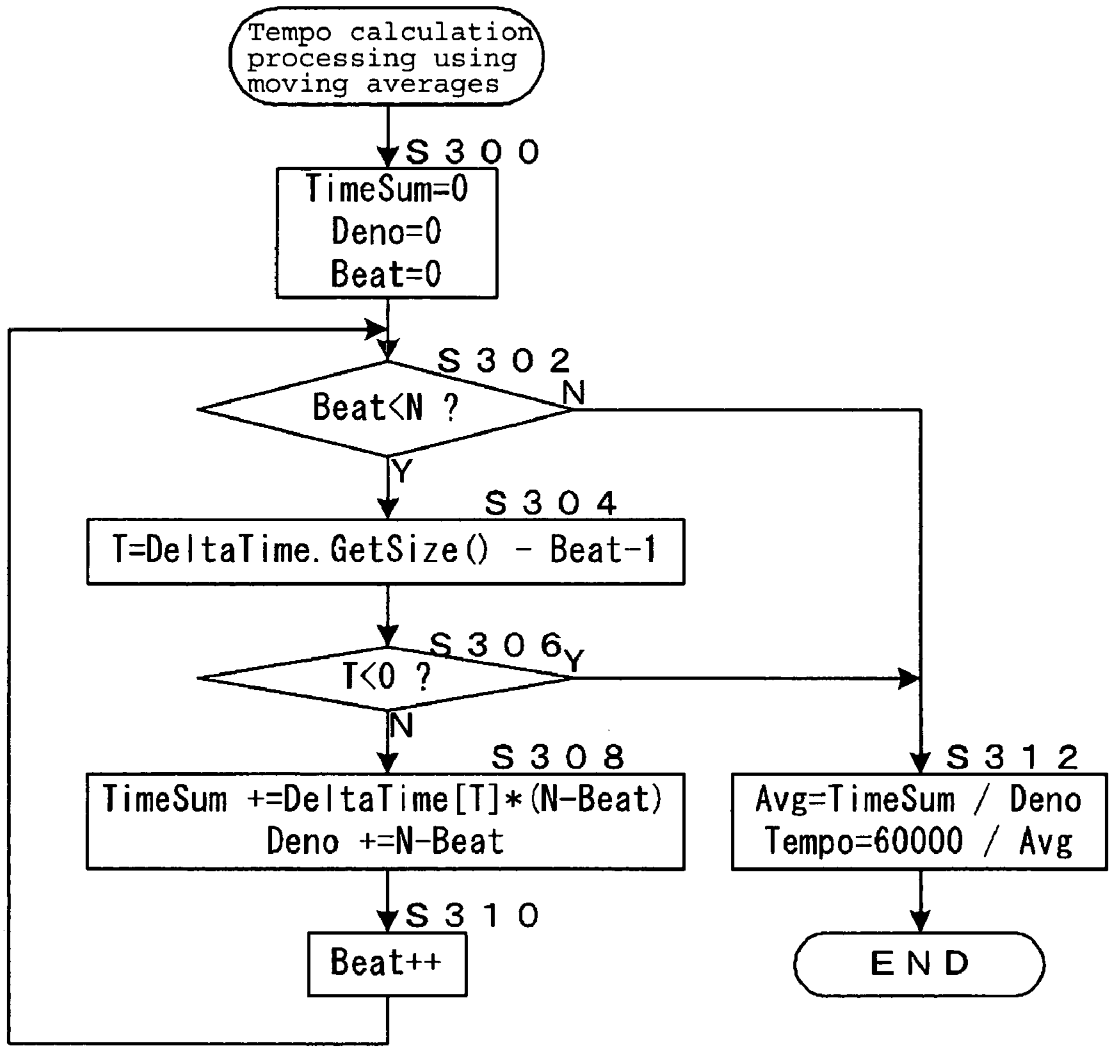
FIG. 9 is a flowchart showing the processing steps of tempo calculation processing using moving averages in step S212 in FIG. 8.

FIG. 9 is a flowchart showing steps in the tempo calculation processing using moving averages, performed in step S212.

First, a value (TimeSum) obtained by adding a value weighted for each beat to DeltaTime (the array of the elapsed time from when the preceding tapping had been performed to when the current tapping was performed), a value (Deno) serving as a divisor when the average tempo is calculated, and a variable (Beat) for counting beats are all set to zero, that is, initialized, in step S300.

It is determined in step S302 whether the variable (Beat) for counting beats is smaller than N. When the variable is not smaller than N (No in step S302), that is, when the variable reaches N or more, TimeSum is divided by Deno to calculate the average time interval (Avg) and 60,000 is divided by the average time interval (Avg) to calculate the average tempo (Temp expressed in BPM (beats per measure), a quarter note corresponds to 120 BMP, for example) in step S312.

When the variable (Beat) for counting beats is smaller than N (Yes in step S302), that is, when the variable has not reached N, the variable (Beat) for counting beats is subtracted from the tapping count which has been counted so far and is decremented by one to calculate a temporary variable T indicating the array number of DeltaTime, in step S304. The variable (Beat) for counting beats is zero for the beat tapped most recently, and can be up to N−1. The variable T serves as an index when the DeltaTime array is accessed at each beat.

It is determined in step S306 whether the variable T is smaller than zero. When the variable T is smaller than zero (Yes in step S306), TimeSum is divided by Deno to calculate the average time interval (Avg) and 60,000 is divided by the average time interval (Avg) to calculate the average tempo (Temp expressed in BPM (beats per measure), a quarter note corresponds to 120 BMP, for example) in step S312.

When the variable T is not smaller than zero (No in step S306), DeltaTime in the variable (Beat) for counting beats is weighted and added to TimeSum in step S308, the variable (Beat) for counting beats is incremented in step S310, and the processing returns to step S302. The above processes are then repeated.

Figure 10:
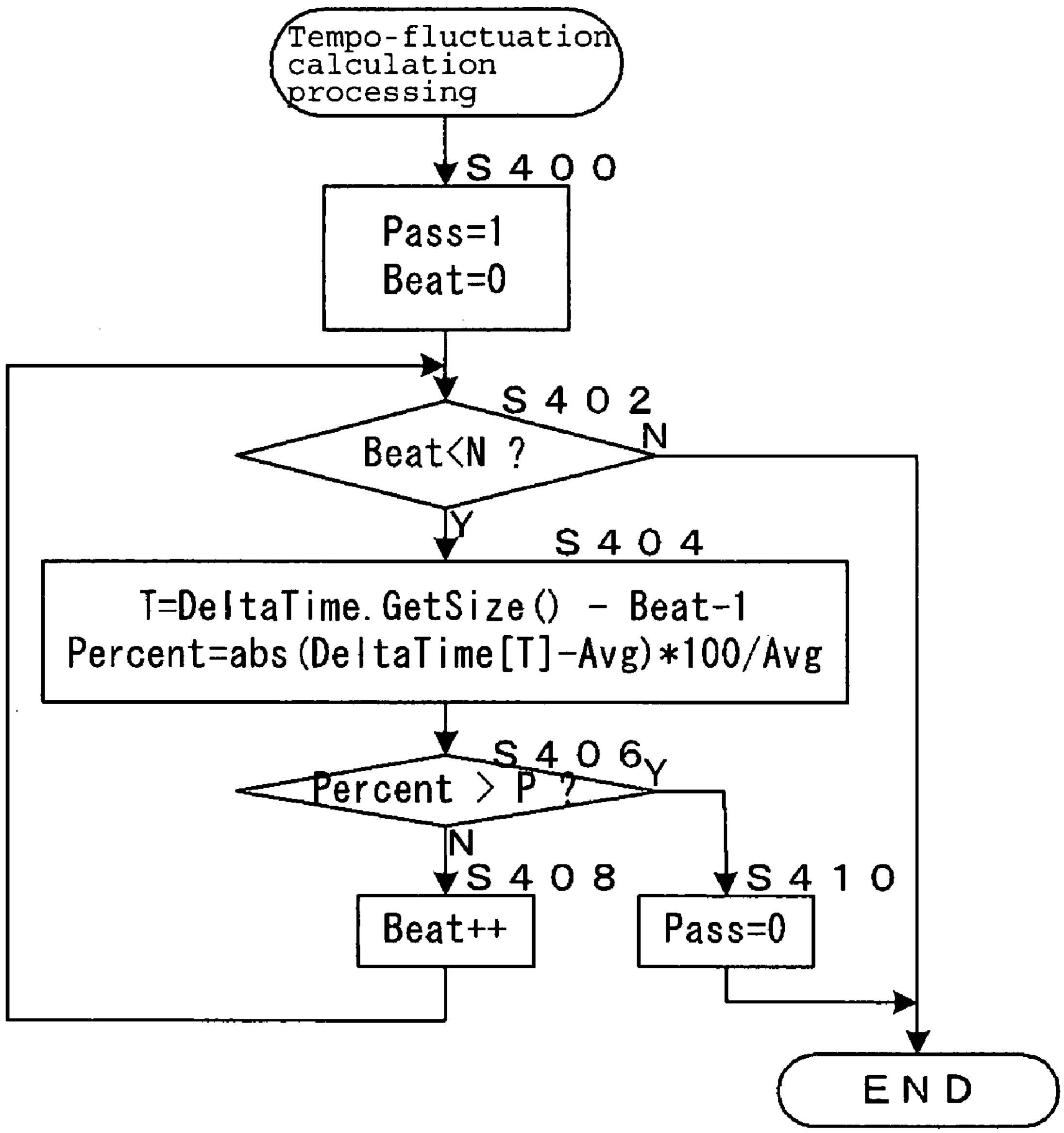
FIG. 10 is a flowchart showing the processing steps of tempo-fluctuation calculation processing in step S216 in FIG. 8.

FIG. 10 is a flowchart showing steps in the tempo-fluctuation calculation processing, performed in step S216.

A tempo-fluctuation check flag (Pass) is set to “1” (which means that the tempo fluctuation is acceptable) and the variable (Beat) for counting beats is set to zero, in step S400.

It is determined in step S402 whether the variable (Beat) for counting beats is smaller than N.

When the variable (Beat) for counting beats is not smaller than N (No in step S402), the tempo-fluctuation calculation processing is terminated.

When the variable (Beat) for counting beats is smaller than N (Yes in step S402), the array number T of DeltaTime in the variable (Beat) is calculated and a beat fluctuation (Percent) at that time is calculated in step S404.

It is determined in step S406 whether the beat fluctuation (Percent) indicating a fluctuation percentage (%) with respect to the average time interval exceeds a tempo-fluctuation permissible value P (7%, for example).

When the beat fluctuation (Percent) indicating the fluctuation percentage (%) with respect to the average time interval exceeds the tempo-fluctuation permissible value P (Yes in step S406), the tempo-fluctuation check flag (Pass) is set to zero in step S410 and the processing is terminated.

When the beat fluctuation (Percent) does not exceed the tempo-fluctuation permissible value P (No in step S406), the variable (Beat) for counting beats is incremented in step S408 and the processing returns to step S402. The above processes are then repeated.

When the tapping-tempo output section 108 determines that the tempo fluctuation falls in a predetermined range, the tapping-tempo output section 108 outputs the tapping tempo, the last tapping time, and the beat value at that time. Then, the tempo determination section 110 selects a beat interval close in number to the tapping tempo from among beat-interval candidates to determine the tempo. The beat-position determination section 111 determines, as the starting beat position, the position of the tapping obtained when it is determined that the tapping fluctuation falls in the predetermined range, and determines each beat position located therebefore and thereafter according to the tempo determined by the tempo determination section 110.

A method for determining, after the starting beat position is decided, beat positions thereafter one by one will be described with reference to FIG. 11. It is assumed that the starting beat was found at the position of the triangular mark in FIG. 11. The second beat position is determined to be a position where the cross-correlation between L(t) and M(t) becomes maximum in the vicinity of a tentative beat position away from the starting beat position by the beat interval “$\tau_{max}$” In other words, when the starting beat position is called $b_0$, the value of “s” which maximizes r(s) in the following expression 5 is obtained. In the expression, “s” indicates a shift from the tentative beat position and is an integer in the range shown in expression 5. “F” is a fluctuation parameter; it is suitable to set “F” to about 0.1, but “F” may be set larger for a musical piece where tempo fluctuation is large. “n” needs to be set to about 5.

Figure 12:
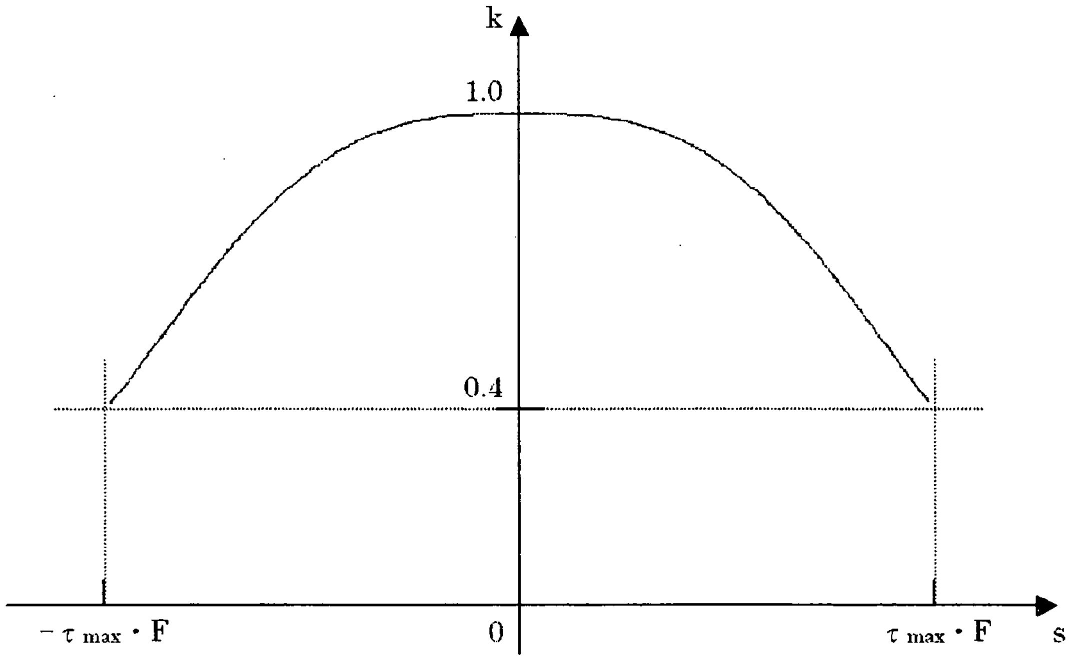
FIG. 12 is a graph showing the distribution of a coefficient "k" which changes according to the value of "s"

In the expression, "k" is a coefficient that is changed according to the value of "s" and is assumed to have a normal distribution such as that shown in FIG. 12.

$$r(s) = \sum_{j=1}^{n} k \cdot L(b_0 + \tau_{\max} \cdot j + s) \quad (-\tau_{\max} \cdot F \leqq s \leqq \tau_{\max} \cdot F) \qquad \text{Expression 5}$$

When the value of "s" that maximizes r(s) is found, the second beat position $b_1$ is calculated by the following expression 6.

$$b_1 = b_0 + \tau_{max} + s \qquad \text{Expression 6}$$

The third beat position and subsequent beat positions can be obtained in the same way.

In a musical piece where the tempo hardly changes, beat positions can be obtained to the end of the musical piece by this method. However, in an actual performance, in some cases, the tempo fluctuates to some extent or becomes slow in parts.

To handle such tempo fluctuation, the following method can be used.

Figure 11:
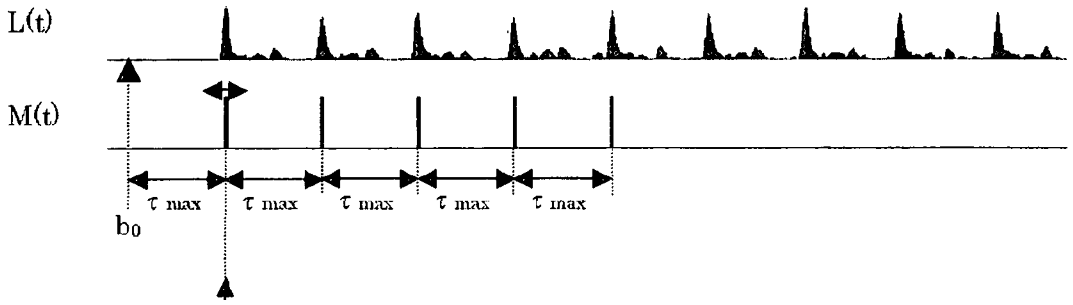
FIG. 11 is a view showing a method for determining subsequent beat positions after the staring beat position has been determined.
Figure 13:
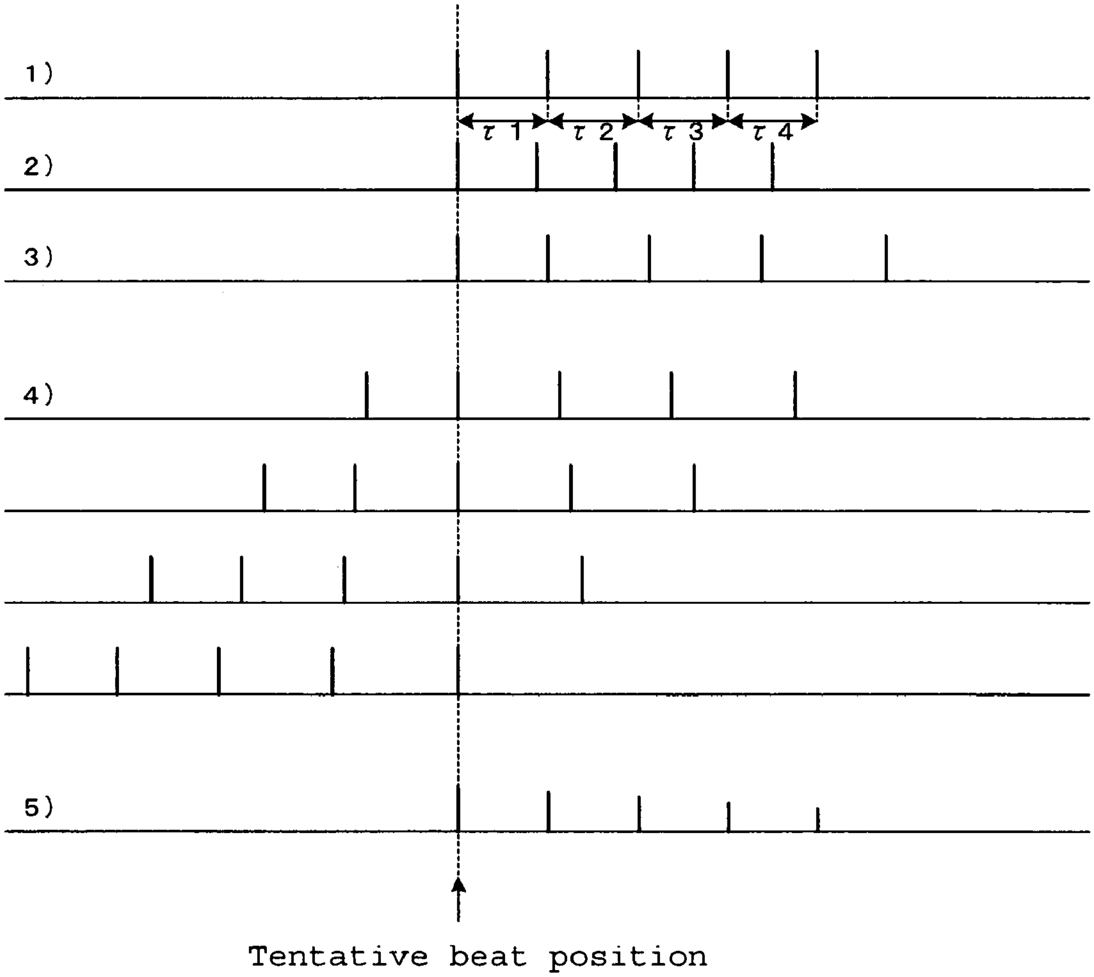
FIG. 13 is a view showing a method for determining second and subsequent beat positions.

In the method, the function M(t) shown in FIG. 11 is changed as shown in FIG. 13. In FIG. 13, row 1 indicates the method described above, that is, $$\tau_1 = \tau_2 = \tau_3 = \tau_4 = \tau_{max}$$

where $\tau_1$, $\tau_2$, $\tau_3$, and $\tau_4$ indicate the time periods between pulses from the start, as shown in the figure. Row 2 indicates that the time periods $\tau_1$ to $\tau_4$ are equally made larger or smaller, that is, $$\tau_1 = \tau_2 = \tau_3 = \tau_4 = \tau_{max} + s(-\tau_{max} \times F \leqq s \leqq \tau_{max} \times F)$$

With this approach, beat positions can be obtained for a case where the tempo suddenly changes. Row 3 is for ritardando (rit.: gradually slower) or for accelerando (accel.: gradually faster), and the time periods between pulses are calculated as follows:

$$\tau_1 = \tau_{max}$$

$$\tau_2 = \tau_{max} + 1 \times s$$

$$\tau_3 = \tau_{max} + 2 \times s(-\tau_{max} \times F \leqq s \leqq \tau_{max} \times F)$$

$$\tau_4 = \tau_{max} + 4 \times s$$

The coefficients used here, 1, 2, and 4, are just examples and may be changed according to the magnitude of a tempo change. Row 4 indicates that the beat position currently to be obtained is set to any of the five pulse positions for rit. or accel. shown in Row 3.

When these are all combined and the cross-correlation between L(t) and M(t) is obtained, beat positions can be determined from the maximum cross-correlation, even for a musical piece having a fluctuating tempo. When row 2 or row 3 is used, the value of the coefficient "k" used for correlation calculation also needs to be changed according to the value of "s".

The magnitudes of the five pulses are currently set to be the same. The total of the incremental values in power of the notes in the scale may be enhanced at the position where a beat is obtained by setting the magnitude of only the pulse at the position of the beat (indicated by a tentative beat position in FIG. 13) to be larger or by setting the magnitudes to be gradually smaller when the pulses are located farther from the position of the beat (indicated by row 5 in FIG. 13). The beat positions are determined in the way described above. When beats are also detected before the beat position output from the tapping-tempo output section 108, the same processing needs to be performed in the waveform forward direction, instead of in the waveform backward direction.

When the position of each beat is determined in the manner described above, the results are stored in a buffer 201. At the same time, the results may be displayed so that the user can check and correct them if they are wrong.

Figure 14:
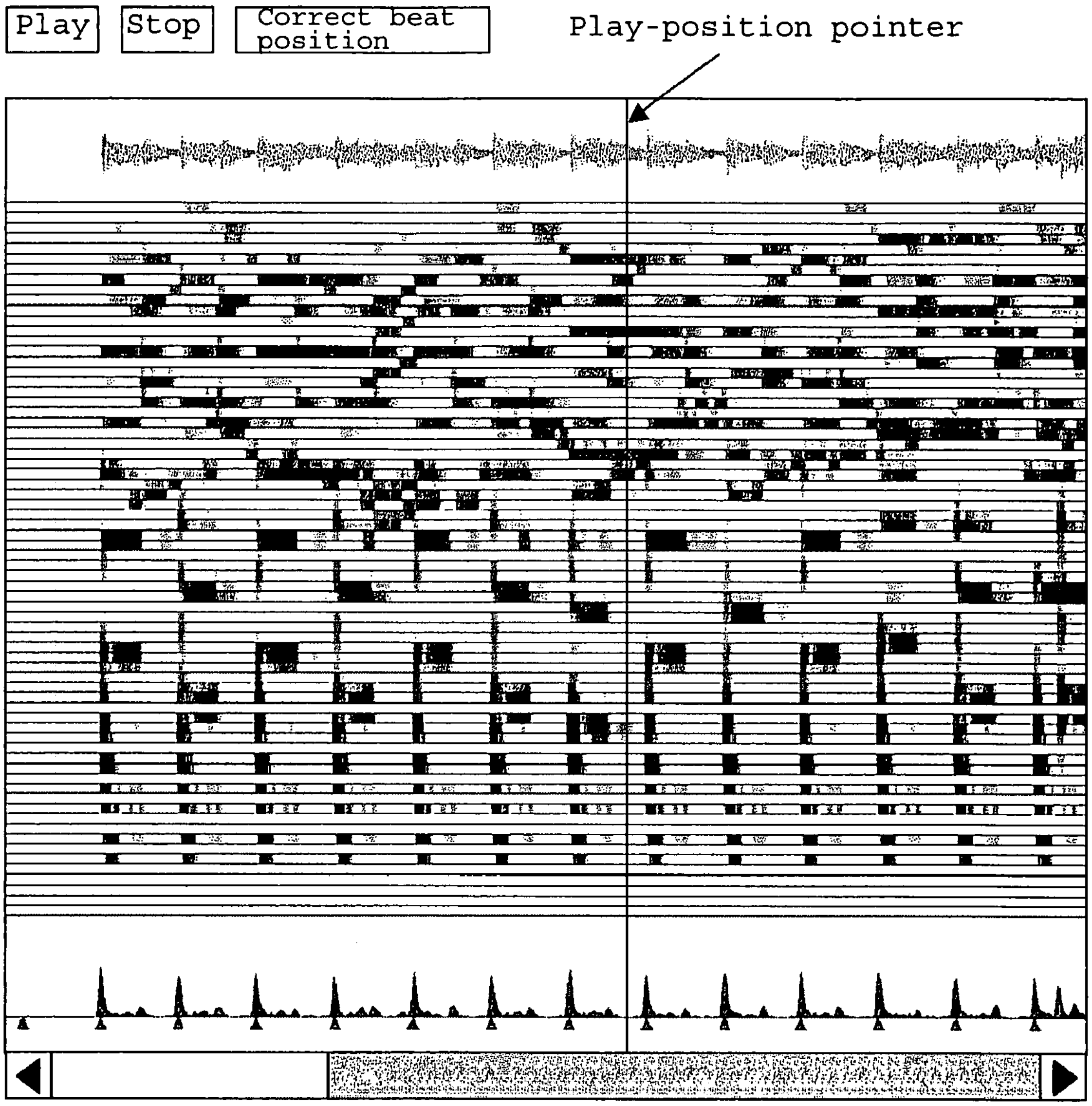
FIG. 14 is a view showing an example of a confirmation screen of beat detection results.

FIG. 14 shows an example of a confirmation screen of beat detection results. Triangular marks indicate the positions of detected beats.

When a "play" button is pressed, the current musical acoustic signal is D/A converted and played back from a speaker or the like. The current playback position is indicated by a play position pointer, such as the vertical line in the figure, and the user can check for errors in beat detection positions while listening to the music. Furthermore, when sound such as that of a metronome is played back at beat-position timing in addition to the playback of the original waveform, checking can be performed not only visually but also aurally, facilitating determination of detection errors. As a method for playing back the sound of a metronome, for example, a MIDI unit can be used.

A beat-detection position is corrected by pressing a "correct beat position" button. When this button is pressed, a crosshairs cursor appears on the screen. If the starting beat position was erroneously detected, when the cursor is moved to the correct position and the mouse is clicked, all beat positions are cleared from a position a certain distance (for example, half of $\tau_{max}$) before the position where the mouse was clicked, the position where the mouse was clicked is set as a tentative beat position, and subsequent beat positions are detected again.

Next, determining a first-beat position will be described, which needs to be performed in order to determine a bar position.

The beat-position determination section 111 determines the position of each beat. However, a bar position is not determined. Therefore, the user is asked to input a meter at the meter input section 103. In addition, while listing to the performance, the user is asked to perform tapping such that the beat value made to glow in step S230 (flash) is "1" at the first beat. When the fluctuation calculation section 107 determines that a fluctuation in tapping tempo, calculated at the above tapping falls in the predetermined range, a first-beat position closest to the tapping beat value is obtained and output as the position of the first beat.

When the position of the first beat (the position of a bar line) is determined in the manner described above, the first-beat position is output to the bar detection section 112. The beat-position determination section 111 has determined the beat positions and the bar detection section 112 has detected the bar-line position. The result is stored in a buffer 202. At the same time, the result may be displayed on the screen to allow the user to change it. Since this method cannot handle musical pieces having a changing meter, it is necessary to ask the user to specify a position where the meter is changed.

With the foregoing structure, from the acoustic signal of a human performance of a musical piece having a fluctuating tempo, the average tempo of the entire piece of music and the correct beat positions, as well as the bar-line position, can be detected.

Second Embodiment

Figure 15:
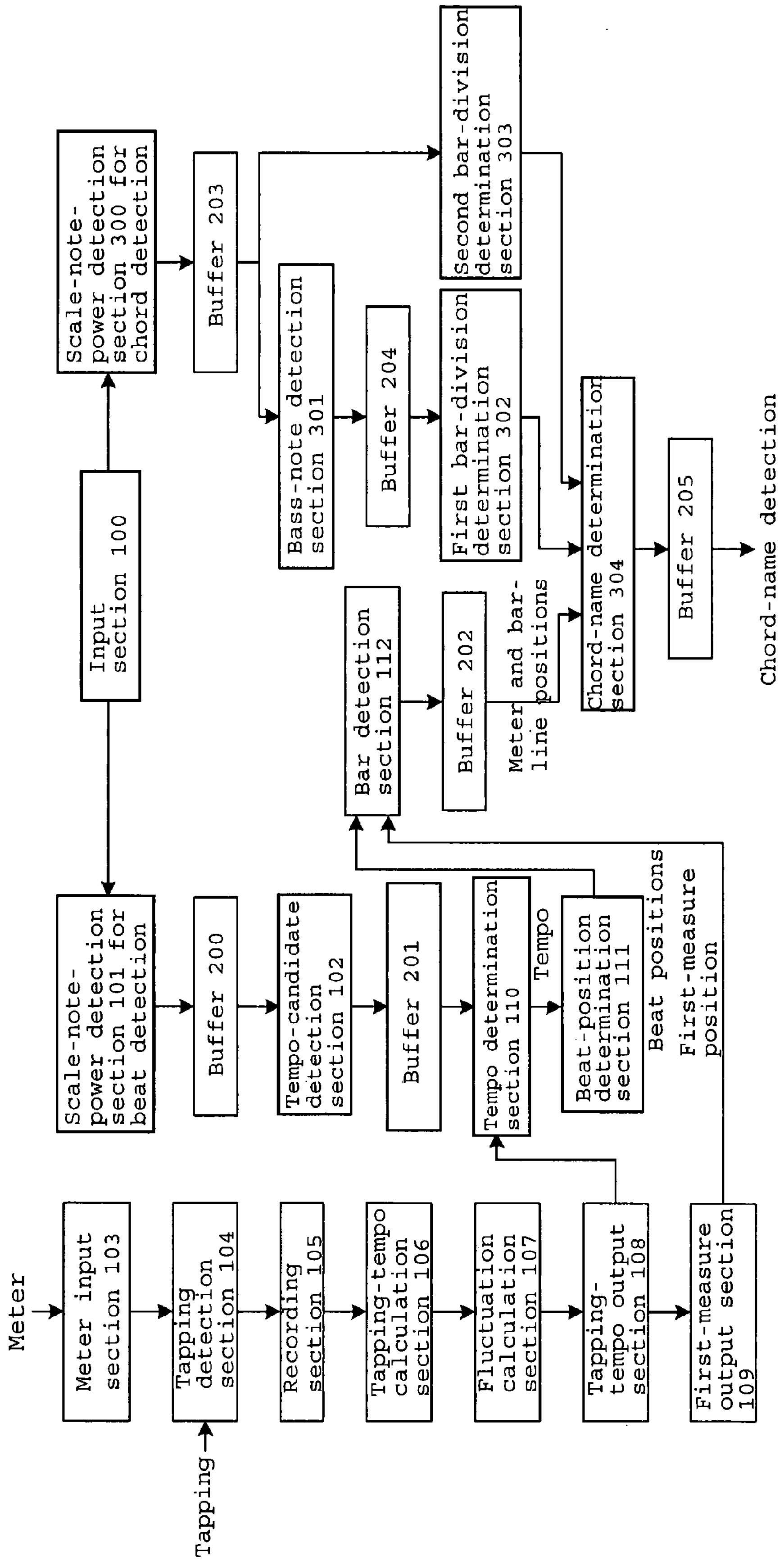
FIG. 15 is a block diagram of a chord detection apparatus using the tempo detection apparatus according to a second embodiment of the present invention.

FIG. 15 is a block diagram of a chord detection apparatus that uses the tempo detection apparatus according to the present invention. In the figure, the structures of a tempo detection section and a bar detection section are basically the same as those described above. Since the structures of a tempo detection part and a chord detection part are partially different from those described above, a description thereof will be given below except for mathematical expressions, with some portions already mentioned above.

In the figure, the chord detection apparatus includes an input section 100 for receiving an acoustic signal; a scale-note-power detection section 101 for beat detection for applying FFT to the received acoustic signal at predetermined time intervals (frames) by using parameters suited to beat detection and for obtaining the power of each note in a scale at each frame interval from the obtained power spectrum; a tempo-candidate detection section 102 for summing up, for all the notes in the scale, an incremental value of the power of each note in the scale at each frame interval to obtain the total of the incremental values of the powers, indicating the degree of change of all the notes at each frame interval, and for detecting an average beat interval and the position of each beat, from the total of the incremental values of the powers; a meter input section to a bar detection section 112, which are the same as those described in the first embodiment; a scale-note-power detection section 300 for chord detection for applying FFT to the received acoustic signal at predetermined time intervals (frames) different from those used for beat detection described above, by using parameters suited to chord detection, and for obtaining the power of each note in the scale at each frame interval from the obtained power spectrum; a bass-note detection section 301 for setting several detection zones in each bar and for detecting a bass note in each of the detection zones from the power of a low note in the scale at a portion corresponding to a first beat in each of the detection zones among the detected power of each note in the scale; a first bar-division determination section 302 for determining whether the bass note is changed according to whether the detected bass note in each of the detection zones is different and for determining whether it is necessary to divide the bar into a plurality of portions according to whether the bass note is changed; a second bar-division determination section 303 for setting several chord detection zones in the bar, for averaging the power of each note in the scale for each frame interval in each of the chord detection zones in a chord detection range specified as a range where chords are mainly performed, for summing up the averaged power of each note in the scale for each of 12 pitch notes in the scale, for dividing the total for each of the 12 pitch notes by the number of summed-up powers to obtain the average power of each of the 12 pitch notes in the scale, for re-arranging the powers in descending order of strength, for determining whether a chord is changed according to whether C notes or more of the top M strongest notes, M being three or more, in the scale in a detection zone are included in the top N strongest notes, N being three or more, in the scale in the detection zone immediately therebefore, and for determining whether it is necessary to divide the bar into a plurality of portions according to the degree of change in the chord; and a chord-name determination section 304 for determining, when the first bar-division determination section 302 and/or the second bar-division determination section 303 determine that it is necessary to divide the bar into several chord detection zones, a chord name in each of the chord detection zones according to the bass note and the power of each note in the scale in each of the chord detection zones and for determining, when the first bar-division determination section 302 and the first and second bar-division determination section 303 determine that it is not necessary to divide the bar into several chord detection zones, a chord name in the bar according to the bass note and the power of each note in the scale in the bar.

The input section 100 receives a musical acoustic signal from which the chord is to be detected. Since the basic structure thereof is the same as the structure of the input section 100 described above, a detailed description thereof is omitted here. If vocal sound, which is usually localized at the center, disturbs subsequent chord detection, the waveform at the right-hand channel may be subtracted from the waveform at the left-hand channel to cancel the vocal sound.

A digital signal output from the input section 100 is input to the scale-note-power detection section 101 for beat detection and to the scale-note-power detection section 300 for chord detection. Since these scale-note-power detection sections are each formed of the sections shown in FIG. 4 and have exactly the same structure, a single scale-note-power detection section can be used for both purposes with its parameters only being changed.

A waveform pre-processing section 101*a*, which is used as a component thereof, has the same structure as described above and down-samples the acoustic signal sent from the input section 100, at a sampling frequency suited to the subsequent processing. The sampling frequency after downsampling, that is, the down-sampling rate, may be changed between beat detection and chord detection, or may be identical to save the down-sampling time.

In beat detection, the down-sampling rate is determined according to a range used for beat detection. To use the performance sounds of rhythm instruments having a high range, such as cymbals and hi-hats, for beat detection, it is necessary to set the sampling frequency after down-sampling to a high frequency. To mainly use the bass note, the sounds of musical instruments such as bass drums and snare drums, and the sounds of musical instruments having a middle range for beat detection, the same down-sampling rate as that employed in the following chord detection may be used.

The down-sampling rate used in the waveform pre-processing section for chord detection is changed according to a chord-detection range. The chord-detection range means a range used for chord detection in the chord-name determination section. When the chord-detection range is the range from C3 to A6 (C4 serves as the center "do"), for example, since the fundamental frequency of A6 is about 1,760 Hz (when A4 is set to 440 Hz), the sampling frequency after down-sampling needs to be 3,520 Hz or higher, and the Nyquist frequency is thus 1,760 Hz or higher. Therefore, when the original sampling frequency is 44.1 kHz (which is used for music CDs), the down-sampling rate needs to be about one twelfth. In this case, the sampling frequency after down-sampling is 3,675 Hz.

Usually in down-sampling processing, a signal is passed through a low-pass filter which removes components having the Nyquist frequency (1,837.5 Hz in the current case), that is, half of the sampling frequency after down-sampling, or higher, and then data in the signal is skipped (11 out of 12 waveform samples are discarded in the current case). The same reason applies as that described above.

When down-sampling is finished in this way in the waveform pre-processing section 101*a*, an FFT calculation section 101*b* applies a fast Fourier transform (FFT) to the output signal of the waveform pre-processing section 101*a* at predetermined time intervals.

FFT parameters (number of FFT points and FFT window shift) are set to different values between beat detection and chord detection. If the number of FFT points is increased to increase the frequency resolution, the FFT window size is enlarged to use a longer time period for one FFT cycle, reducing the time resolution. This FFT characteristic needs to be taken into account. (In other words, for beat detection, it is better to increase the time resolution with the frequency resolution suppressed.) There is a method in which, instead of using a waveform having the same length as the window length, waveform data is specified only for a part of the window and the remaining part is filled with zeros to increase the number of FFT points without suppressing the time resolution. However, the number of waveform samples needs to be set up to a certain point in order to also detect low-note power correctly in the case of the present embodiment.

The above points have been taken into account. In the present embodiment, in beat detection, the number of FFT points is set to 512, the window shift is set to 32 samples (window overlap is 15/16), and filling with zeros is not performed; and, in chord detection, the number of FFT points is set to 8,192, the window shift is set to 128 samples (window overlap is 63/64), and 1,024 waveform samples are used in one FFT cycle. When the FFT calculation is performed with these settings, the time resolution is about 8.7 ms and the frequency resolution is about 7.2 Hz in beat detection; and the time resolution is about 35 ms and the frequency resolution is about 0.4 Hz in chord detection. Since each note in the scale of which the power is to be obtained falls in the range from C1 to A6, a frequency resolution of about 0.4 Hz in chord detection is sufficient because the smallest frequency difference in fundamental frequency, which is between C1 and C#1, is about 1.9 Hz. A time resolution of 8.7 ms in beat detection is sufficient because the length of a thirty-second note is 25 ms in a musical piece having a tempo of 300 quarter notes per minutes.

The FFT calculation is performed in this way in each frame interval; the squares of the real part and the imaginary part of the FFT result are added and the sum is square-rooted to calculate the power spectrum; and the power spectrum is sent to a power detection section 101*c*.

The power detection section 101*c* calculates the power of each note in the scale from the power spectrum calculated in the FFT calculation section 101*b*. The FFT calculates just the powers of frequencies that are integer multiples of the value obtained when the sampling frequency is divided by the number of FFT points. Therefore, the same process as that described above is performed to detect the power of each note in the scale from the power spectrum. Specifically, the power of the spectrum having the maximum power among power spectra corresponding to the frequencies falling in the range of 50 cents (100 cents correspond to one semitone) above and below the fundamental frequency of each note (from C1 to A6) in the scale is set to the power of the note.

When the powers of all the notes in the scale have been detected, they are stored in a buffer. The waveform reading position is advanced by a predetermined time interval (one frame, which corresponds to 32 samples for beat detection and to 128 samples for chord detection in the previous case), and the processes in the FFT calculation section 101*b* and the power detection section 101*c* are performed again. This set of steps is repeated until the waveform reading position reaches the end of the waveform.

With the above-described processing, the power of each note in the scale for each frame interval for the acoustic signal input to the input section 100 is stored in the buffer 200 and a buffer 203 for beat detection and chord detection, respectively.

Next, since the tempo-candidate detection section 102 to the bar detection section 112 in FIG. 15 have the same structures as the tempo-candidate detection section 102 to the bar detection section 112 described in the first embodiment, detailed descriptions thereof are omitted here.

The positions of bar lines (frame number of each bar) are determined in the same procedure by the same structure as described above. Then, the bass note in each bar is detected.

The bass note is detected from the power of each note in the scale for each frame interval, output from the scale-note-power detection section 300 for chord detection.

Figure 16:
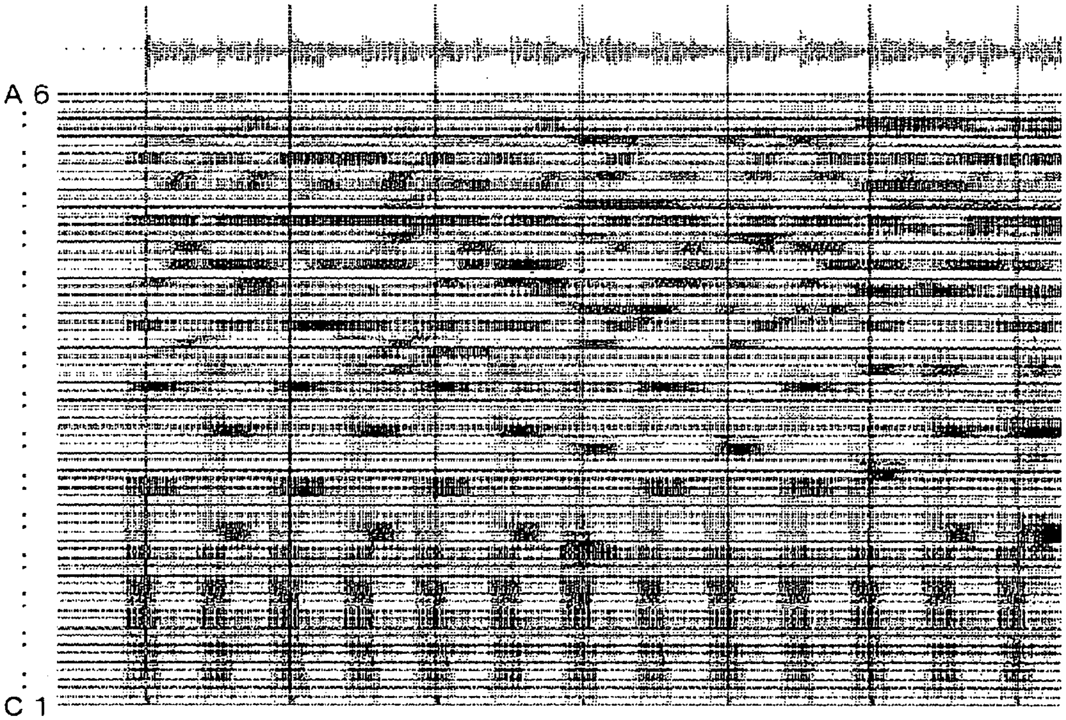
FIG. 16 is a graph showing the power of each note in the scale at each frame interval in the same part as that shown in FIG. 6, output from a scale-note-power detection section for chord detection.

FIG. 16 shows the power of each note in the scale for each frame interval at the same portion in the same musical piece as that shown in FIG. 6, output from the scale-note-power detection section 300 for chord detection. As shown in the figure, since the frequency resolution in the scale-note-power detection section 300 for chord detection is about 0.4 Hz, the powers of all the notes from C1 to A6 are extracted.

In the previously developed apparatus, since it is possible that the bass note differs between a first half and a second half in a bar, each bar is divided into a first half and a second half; a bass note is detected in each half; and when different bass notes are detected in the first half and the second half, the chord is also detected in each of the first half and the second half. In that method, however, when different chords are used but an identical bass note is detected, for example, when the C chord is used in the first half of a bar and the Cm chord is used in the second half, since the bass note is identical, the bar is not divided and the C chord is detected in the whole bar.

In addition, in the above apparatus, the bass note is detected in the entire detection zone. In other words, when the detection zone is a bar, a strong note in the entire bar is detected as the bass note. In jazz music where the bass note changes frequently (the bass note changes in units of quarter notes or the like), however, the bass note cannot be detected correctly with this method.

Therefore, in the structure of the present embodiment, when the bass-note detection section 301 detects a bass note, several detection zones are specified in each bar, and the bass note in each detection zone is detected from the power of a low note in the scale corresponding to the first beat in each detection zone among the detected powers of the notes in the scale. This is because the root notes of the chord are played at the first beat in many cases even when the bass note changes frequently, as described above.

The bass note is obtained from the average strength of the powers of notes in the scale in a bass-note detection range at a portion corresponding to the first beat in the detection zone.

When the power of the i-th note in the scale at frame time "t" is called $L_i(t)$, the average power $L_{avgi}(f_s, f_e)$ of the i-th note in the scale from frame $f_s$ to frame $f_e$ can be calculated by the following expression 7:

Expression 7

$$L_{avgi}(f_s, f_e) = \frac{\sum_{t=f_s}^{f_e} L_i(t)}{f_e - f_s + 1} \quad (f_s \leqq f_e)$$

The bass-note detection section 301 calculates the average powers in the bass-note detection range, for example, in the range from C2 to B3, and determines the note having the largest average power in the scale as being the bass note. To prevent the bass note from being erroneously detected in a musical piece where no sound is included in the bass-note detection range or in a portion where no sound is included, an appropriate threshold may be specified so that the bass note is ignored if the power of the detected bass note is equal to or smaller than the threshold. When the bass note is regarded as an important factor in subsequent chord detection, it may be determined whether the detected bass note continuously keeps a predetermined power or more during the bass-note detection zone for the first beat to select only a more reliable one as the bass note. Further, instead of determining the note having the largest average power in the scale in the bass-note detection range as being the bass note, the bass note may be determined such that the average power for each note is used to calculate the average power for each of 12 pitch names, the pitch name having the largest average power is determined to be the base pitch name, and the note having the largest average power in the scale among the notes included in the bass-note detection range, having the base pitch name is determined as being the bass note.

When the bass note is determined, the result is stored in a buffer 204. The bass-note detection result may be displayed on the screen to allow the user to correct it if it is wrong. Since the bass range may change, depending on the musical piece, the user may be allowed to change the bass-note detection range.

Figure 17:
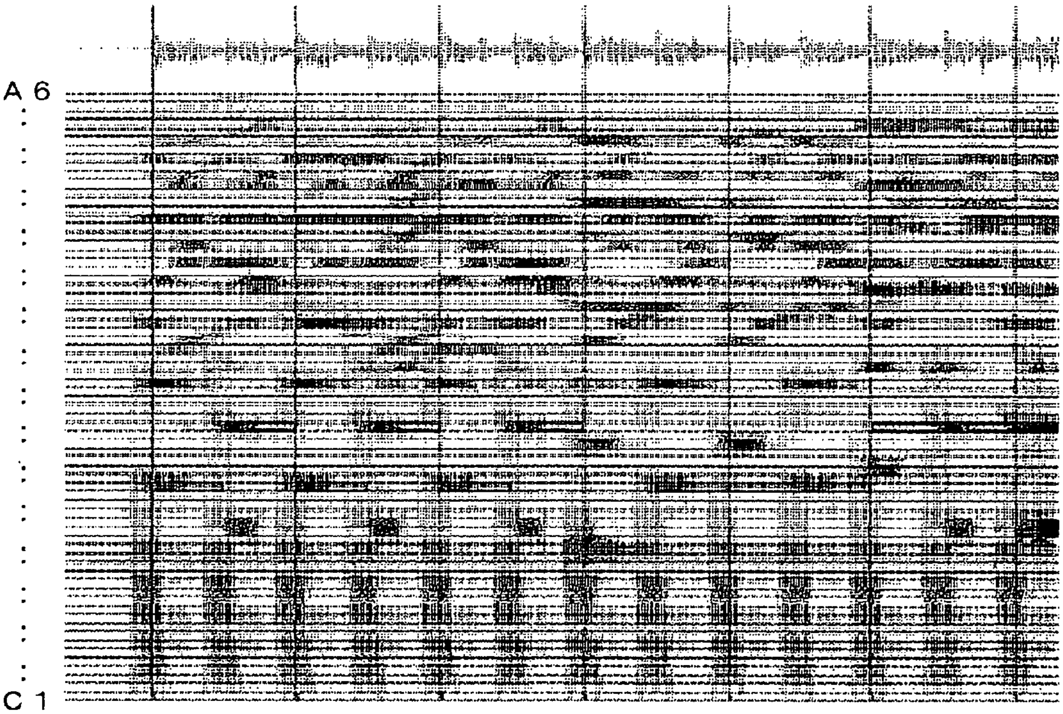
FIG. 17 is a graph showing a display example of bass-note detection results obtained by a bass-note detection section.

FIG. 17 shows a display example of the bass-note detection result obtained by the bass-note detection section 301.

Next, the first bar-division determination section 302 determines whether the bass note changes according to whether the detected bass note differs in each detection zone and determines whether it is necessary to divide the bar into a plurality of portions according to whether the bass note changes. In other words, when the detected bass note is identical in each detection zone, it is determined that it is not necessary to divide the bar; in contrast, when the detected bass note differs in each detection zone, it is determined that it is necessary to divide the bar into a plurality of portions. In the latter case, it may be determined again whether it is necessary to divide each half of the plurality of portions further.

The second bar-division determination section 303 first specifies a chord detection range. The chord detection range is a range where chords are mainly played and is assumed, for example, to be in the range from C3 to E6 (C4 serves as the center "do").

The power of each note in the scale for each frame interval in the chord detection range is averaged in a detection zone, such as half of a bar. The averaged power of each note in the scale is summed up for each of 12 pitch notes (C, C#, D, D#, . . . , and B), and the summed-up power is divided by the number of powers summed up to obtain the average power of each of the 12 pitch notes.

The average powers of the 12 pitch notes are obtained in the chord detection range for the first half and second half of the bar and are re-arranged in descending order of strength.

Figure 18A:
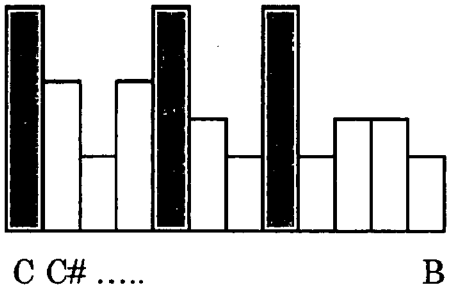
FIG. 18A and FIG. 18B are views showing the power of each note in the scale in a first half and a second half of a bar, respectively.
Figure 18B:
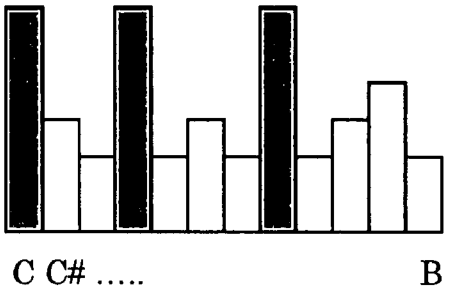

As shown in FIG. 18A and FIG. 18B, it is determined whether the top three (this number is called "M") notes, for example, in strength in the second half are included in the top three (this number is called "N") notes, for example, in strength in the first half, and it is determined whether the chord changes according to whether the M notes or more are included. According to this determination, the second bar-division determination section 303 determines the degree of change in chord and determines, according to the result, whether it is necessary to divide the bar into a plurality of portions.

When the three notes (this number is called "C") or more are included (that is, all three are included), the second bar-division determination section 303 determines that the chord does not change between the first half and the second half of the bar and further determines that the division of the bar due to the degree of change in chord need not be performed.

Changing the values of "M", "N", and "C" used in the second bar-division determination section 303 changes how the bar is divided depending on the degree of change in the chord. In the foregoing example, where "M", "N", and "C" are all set to "3", a change in the chord is rather strictly checked. When "M" is set to "3", "N" is set to "6", and "C" is set to "3" (which means determining whether the top three notes in the second half are all included in the top six notes in the first half), for example, it is determined that pieces of sound similar to each other to some extent have an identical chord.

A description has been given in which the first half and the second half are each further divided into two halves to have four divisions in the bar in the quadruple meter. A more correct determination suited to actual general music can be made, setting "M" to "3", "N" to "3" and "C" to "3", to determine whether to divide the bar into the first half and the second half and, setting "M" to "3", "N" to "6" and "C" to "3", to determine whether to divide each of the first half and the second half into two further halves.

The chord-name determination section 304 determines the chord name in each chord detection zone according to the bass note and the power of each note in the scale in each chord detection zone when the first bar-division determination section 302 and/or the second bar-division determination section 303 determine that it is necessary to divide the bar into several chord detection zones, or determines the chord name in the bar according to the bass note and the power of each note in the scale in the bar when the first bar-division determination section 302 and the second bar-division determination section 303 determine that it is not necessary to divide the bar into several chord detection zones.

The chord-name determination section 304 actually determines the chord name in the following way. In the present embodiment, the chord detection zone and the bass-note detection zone are the same. The average power of each note in the scale in a chord detection range, for example, in the range from C3 to A6, is calculated in the chord detection zone, the names of several top notes in average power are detected, and chord-name candidates are selected according to the names of these notes and the name of the bass note.

Since a note having a large power is not necessarily a component of the chord, several notes, such as five notes, are detected, all combinations of at least two of those notes are found, and chord-name candidates are selected according to the names of the notes in all the combinations and the name of the bass note.

Also in chord detection, notes having average powers which are not larger than a threshold may be ignored. In addition, the user may be allowed to change the chord detection range. Furthermore, instead of extracting chord-component candidates sequentially from the note having the largest average power in the scale in the chord detection range, the average power of each note in the chord detection range may be used to calculate the average power for each of 12 pitch names to extract chord-component candidates sequentially from the pitch name having the largest average power.

To extract chord-name candidates, the chord-name determination section 304 searches a chord-name data base which stores intervals from chord types (such as "m" and M7") and the root notes of chord-component notes. Specifically, all combinations of at least two of the five detected note names are extracted; it is determined whether the intervals among these extracted notes match the intervals among chord-component notes stored in the chord-name data base, one by one; when they match, the root note is found from the name of a note included in the chord-component notes; and a chord symbol is assigned to the name of the note of the root note to determine the chord name. Since a root note or a fifth note of a chord may be omitted in a musical instrument that plays the chord, even if these types of notes are not included, the corresponding chord-name candidates are extracted. When the bass note is detected, the note name of the bass note is added to the chord names of the chord-name candidates. In other words, when a root note of a chord and the bass note have the same note name, nothing needs to be done. When they differ, a fraction chord is used.

If too many chord-name candidates are extracted in the above-described method, a restriction may be applied according to the bass note. Specifically, when the bass note is detected, if the bass-note name is not included in the root names of any chord-name candidate, the chord-name candidate is deleted.

When a plurality of chord-name candidates is extracted, the chord-name determination section 304 calculates a likelihood (how likely it is to happen) in order to select one of the plurality of chord-name candidates.

The likelihood is calculated from the average of the strengths of the powers of all chord-component notes in the chord detection range and the strength of the power of the root notes of the chord in the bass-note detection range. Specifically, when the average of the average powers of all component notes of an extracted chord-name candidate in the chord detection zone is called $L_{avgc}$ and the average power of the root notes of the chord in the bass-note detection zone is called $L_{avgr}$, the likelihood is calculated as the average of these two averages as shown in the following expression 8. According to another method, the likelihood may be calculated as the ratio in (average) power between a chord tone (chord-component notes) and a non-chord tone (note other than chord-component notes) in the chord detection range.

$$\text{Likelihood} = \frac{L_{avgc} + L_{avgr}}{2} \qquad \text{Expression 8}$$

When a plurality of notes having the same pitch name is included in the chord detection range or in the bass-note detection range, the note having the strongest average power among them is used in the chord detection range or in the bass-note detection range. Alternatively, the average power of each note in the scale may be averaged for the 12 pitch names to use the average power for each of the 12 pitch names in each of the chord detection range and the bass-note detection range.

Further, musical knowledge may be introduced into the calculation of the likelihood. For example, the power of each note in the scale is averaged in all frames; the averaged power of each note in the scale is averaged for each of the 12 pitch names to calculate the strength of each of the 12 pitch names, and the tune of the musical piece is detected from the distribution of the strength. The diatonic chord of the tune is multiplied by a prescribed constant to increase the likelihood. Or, the likelihood is reduced for a chord having a component note(s) which is outside the notes in the diatonic scale of the tune, according to the number of the notes outside the notes in the diatonic scale of the tune. Further, patterns of common chord progressions may be stored in a data base so that the likelihood for a chord candidate which is found, in comparison with the data base, to be included in the patterns of common chord progressions is increased by being multiplied by a prescribed constant.

The name of the chord having the largest likelihood is determined to be the chord name. Chord-name candidates may be displayed together with their likelihood to allow the user to select the chord name.

In either of these cases, when the chord-name determination section 304 determines the chord name, the result is stored in a buffer 205 and is also displayed on the screen.

Figure 19:
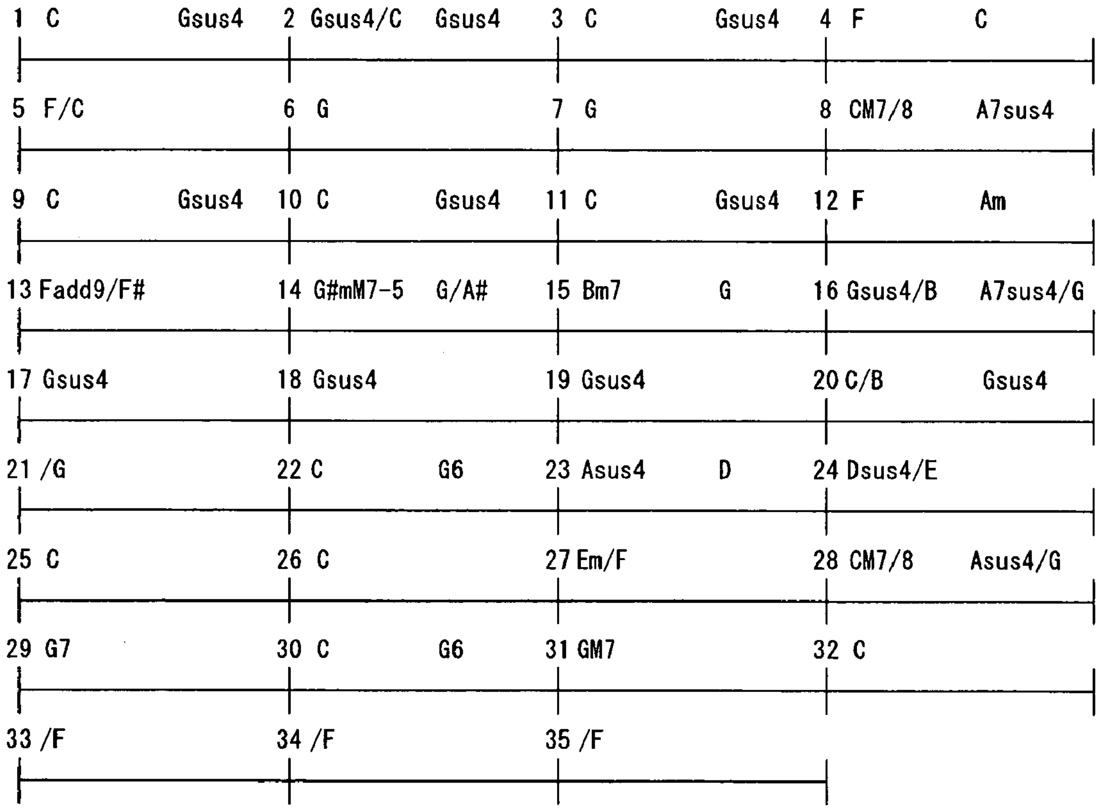
FIG. 19 is a view showing an example of a confirmation screen of chord detection results.

FIG. 19 shows a display example of chord detection results obtained by the chord-name determination section 304. It is preferred that the detected chords and the bass notes be played back by using a MIDI unit or the like in addition to displaying, in this way, the detected chords on the screen. This is because, in general, it cannot be determined whether the displayed chords are correct just by looking at the names of the chords.

According to the configuration of the present embodiment described above, even persons other than professionals having special musical knowledge can detect chord names in an input musical acoustic signal in which the sounds of a plurality of musical instruments are mixed, such as those in music CDs, from the overall sound without detecting each piece of musical-note information.

Further, according to the configuration of the present embodiment, chords having the same component notes can be distinguished. Even if the performance tempo fluctuates, or even for a sound source that outputs a performance whose tempo is intentionally fluctuated, the chord name in each bar can be detected.

In particular, in the configuration of the present embodiment, since the bar is divided according to not only the bass note but also the degree of change in the chord to detect the chord, even if the bass note is identical, when the degree of change in the chord is large, the bar is divided and the chords are detected. In other words, if the chord changes in a bar with an identical bass note being maintained, for example, the correct chords can be detected. The bar can be divided in various ways according to the degree of change in the bass note and the degree of change in the chord.

Third Embodiment

A third embodiment of the present invention differs from the second embodiment in that the Euclidean distance of the power of each note in the scale is calculated to determine the degree of change in the chord to divide a bar and to detect chords.

In that case, however, if the Euclidean distance is simply calculated, it becomes large at a sudden sound increase (at the start of a musical piece or the like) and a sudden sound attenuation (at the end of a musical piece or a break), causing the risk of dividing the bar just due to magnifications of the sound even though the chord actually has no change. Therefore, before the Euclidean distance is calculated, the power of each note in the scale is normalized as shown in FIGS. 20A to D (the powers shown in FIG. 20A are normalized to those shown in FIG. 20C, and the powers shown in FIG. 20B are normalized to those shown in FIG. 20D). When normalization to the smallest power, not to the largest power, is performed (see FIGS. 20A to D), the Euclidean distance is reduced at a sudden sound change, eliminating the risk of erroneously dividing the bar.

The Euclidean distance of the power of each note in the scale is calculated according to the following expression 9. When the Euclidean distance is larger than the average of the powers of all notes in all frames, for example, the first bar-division determination section 302 determines that the bar should be divided.

Expression 9

$$\text{Euclidean distance} = \sqrt{\sum_{i=0}^{11} (PowerOfNote2[i] - PowerOfNote1[i]) * (PowerOfNote2[i] - PowerOfNote1[i])}$$

*PowerOfNote1*: Array of the average power of each of 12 pitch notes in chord detection zone 1 (12 notes from *C* to *B*)

*PowerOfNote2*: Array of the average power of each of 12 pitch notes in chord detection zone 2 (12 notes from *C* to *B*)

To be more detailed, when the Euclidean distance is larger than "T" multiplied by the average of the powers of all the notes in all the frames, it is necessary to divide the bar. When the value "T" is changed, the bar-division threshold can be changed (adjusted) to a desired value.

The tempo detection apparatus and the tempo-detection computer program according to the present invention are not limited to those described above with reference to the drawings, and can be modified in various manners within the scope of the present invention.

The tempo detection apparatus and the tempo-detection computer program according to the present invention can be used in various fields, such as video editing processing for synchronizing events in a video track with beat timing in a musical track when a musical promotion video is created; audio editing processing for finding the positions of beats by beat tracking and for cutting and pasting the waveform of an acoustic signal of a musical piece; live-stage event control for controlling elements such as the color, brightness, direction and special lighting effect in synchronization with a human performance and for automatically controlling audience hand clapping time and audience cries of excitement; and computer graphics in synchronization with music.

The entire disclosure of Japanese Patent Application No. 2006-216362, filed on Aug. 9, 2006, including specification, claims, drawings and summary, is incorporated herein by reference in its entirety.

What is claimed is:

1. A tempo detection apparatus comprising:

signal input means for receiving an acoustic signal;

scale-note-power detection means for applying a fast Fourier transform to the received acoustic signal at predetermined frame intervals and for obtaining the power of each note in a scale at each frame interval from the obtained power spectrum;

tempo-candidate detection means for summing up, for all the notes in the scale, an incremental value of the power of each note in the scale at the predetermined frame intervals to obtain a total of the incremental values of the powers, indicating the degree of change of all the notes at each frame interval, and for obtaining an average beat interval from the total of the incremental values of the powers to detect tempo candidates;

meter input means for receiving meter input by a user;

tapping detection means for detecting tapping input by the user;

recording means for recording tapping intervals, the time when each tapping is performed, and a beat value of each tapping;

tapping-tempo calculation means for calculating moving averages of the tapping intervals to calculate a tempo;

fluctuation calculation means for calculating a fluctuation in tapping tempo for each of latest moving averages;

tapping-tempo output means for outputting, when the fluctuation falls in a predetermined range, the tapping tempo, the time when the last tapping was performed, and a beat value at that time;

tempo determination means for selecting a beat interval close in number to the tapping tempo output from the tapping-tempo output means, from among beat-interval candidates detected by the tempo-candidate detection means;

first-beat-position output means for outputting a first-beat position closest to the beat value of tapping obtained when the fluctuation calculation means determines that tapping fluctuation falls in the predetermined range;

beat-position determination means for determining, as the starting beat position, the position of the tapping obtained when the fluctuation calculation means determines that tapping fluctuation falls in the predetermined range, and for determining each beat position therebefore and thereafter according to the tempo determined by the tempo determination means; and bar detection means for detecting a bar-line position according to the first-beat position output from the first-beat-position output means and each beat position output from the beat-position determination means.

2. The tempo detection apparatus according to claim 1, wherein the beat-position determination means calculates cross-correlation of the total of the incremental values of the powers of all the notes in the scale and a function having a period equal to the beat interval determined by the tempo determination means to determine the beat positions.

3. The tempo detection apparatus according to claim 1, wherein the beat-position determination means calculates cross-correlation of the total of the incremental values of the powers of all the notes in the scale and a function having a period equal to the beat interval determined by the tempo determination means, plus or minus a certain amount, to determine the beat positions.

4. The tempo detection apparatus according to claim 1, wherein the beat-position determination means calculates cross-correlation of the total of the incremental values of the powers of all the notes in the scale and a function having periods gradually increasing from or gradually decreasing from the beat interval determined by the tempo determination means to determine the beat positions.

5. The tempo detection apparatus according to claim 1, wherein the beat-position determination means calculates cross-correlation of the total of the incremental values of the powers of all the notes in the scale and a function having periods gradually increasing from or gradually decreasing from the beat interval determined by the tempo determination means, with beat positions in a middle portion being shifted, to determine the beat positions.

6. A tempo-detection computer program disposed on a computer readable medium to be read and executed by a computer to cause the computer to function as:

signal input means for receiving an acoustic signal;

scale-note-power detection means for applying a fast Fourier transform to the received acoustic signal at predetermined frame intervals and for obtaining the power of each note in a scale at each frame interval from the obtained power spectrum;

tempo-candidate detection means for summing up, for all the notes in the scale, an incremental value of the power of each note in the scale at the predetermined frame intervals to obtain a total of the incremental values of the powers, indicating the degree of change of all the notes at each frame interval, and for obtaining an average beat interval from the total of the incremental values of the powers to detect tempo candidates;

meter input means for receiving meter input by a user;

tapping detection means for detecting tapping input by the user;

recording means for recording tapping intervals, the time when each tapping is performed, and a beat value of each tapping;

tapping-tempo calculation means for calculating moving averages of the tapping intervals to calculate a tempo;

fluctuation calculation means for calculating a fluctuation in tapping tempo for each of latest moving averages;

tapping-tempo output means for outputting, when the fluctuation falls in a predetermined range, the tapping tempo, the time when the last tapping was performed, and a beat value at that time;

tempo determination means for selecting a beat interval close in number to the tapping tempo output from the tapping-tempo output means, from among beat-interval candidates detected by the tempo-candidate detection means;

first-beat-position output means for outputting a first-beat position closest to the beat value of tapping obtained when the fluctuation calculation means determines that tapping fluctuation falls in the predetermined range;

beat-position determination means for determining, as the starting beat position, the position of the tapping obtained when the fluctuation calculation means determines that tapping fluctuation falls in the predetermined range, and for determining each beat position therebefore and thereafter according to the tempo determined by the tempo determination means; and bar detection means for detecting a bar-line position according to the first-beat position output from the first-beat-position output means and each beat position output from the beat-position determination means.

* * * * *